US012235470B2

(12) United States Patent
Jung et al.

(10) Patent No.: US 12,235,470 B2
(45) Date of Patent: Feb. 25, 2025

(54) LENS DRIVING DEVICE AND CAMERA MODULE COMPRISING SAME

(71) Applicant: LG INNOTEK CO., LTD., Seoul (KR)

(72) Inventors: Tae Jin Jung, Seoul (KR); Sang Jun Min, Seoul (KR); Sung Guk Lee, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 8 days.

(21) Appl. No.: 17/523,564

(22) Filed: Nov. 10, 2021

(65) Prior Publication Data

US 2022/0066233 A1 Mar. 3, 2022

Related U.S. Application Data

(63) Continuation of application No. 16/142,467, filed on Sep. 26, 2018, now Pat. No. 11,204,510, which is a
(Continued)

(30) Foreign Application Priority Data

Jan. 2, 2014 (KR) .................. 10-2014-0000122
Jul. 15, 2014 (KR) .................. 10-2014-0089198

(51) Int. Cl.
*G02B 27/64* (2006.01)
*G02B 7/08* (2021.01)
(Continued)

(52) U.S. Cl.
CPC ............ *G02B 27/646* (2013.01); *G02B 7/08* (2013.01); *G03B 3/10* (2013.01); *G03B 5/00* (2013.01);
(Continued)

(58) Field of Classification Search
CPC .......... G02B 27/646; G02B 7/08; G02B 7/04; G02B 7/09; G02B 7/102; G02B 7/10;
(Continued)

(56) References Cited

U.S. PATENT DOCUMENTS 6,670,986 B1 12/2003 Ben Shoshan et al.
7,881,598 B1 2/2011 Wu et al.
(Continued)

FOREIGN PATENT DOCUMENTS

CN            1790147 A     6/2006
CN        200947149 Y     9/2007
(Continued)

OTHER PUBLICATIONS

Machine translaton of KR20120065491 (Year: 2012).*
(Continued)

*Primary Examiner* — Ephrem Z Mebrahtu
(74) *Attorney, Agent, or Firm* — Birch, Stewart, Kolasch & Birch, LLP

(57) ABSTRACT

A lens driving device according to an embodiment comprises: a bobbin wherein at least one lens is installed inside thereof and a first coil is installed on the outer circumferential surface thereof; a first magnet arranged around the bobbin so as to be opposite to the first coil; a housing for supporting the first magnet; upper and lower elastic members coupled with the bobbin and the housing; a first sensor for sensing displacement of the bobbin in the first direction; a second magnet arranged so as to be opposite to the first sensor; a base arranged to be spaced apart from the housing by a certain distance; a second coil arranged so as to be opposite to the first magnet; a circuit board whereon the second coil is installed; a plurality of support members for supporting the housing so as to be movable in the second and third directions which are orthogonal to the first direction (Continued)

with respect to the base and for connecting at least one of the upper and lower elastic members to the circuit board; and a second sensor for sensing displacement of the housing in the second or third direction with respect to the base.

20 Claims, 16 Drawing Sheets

Related U.S. Application Data continuation of application No. 15/109,590, filed as application No. PCT/KR2014/013066 on Dec. 30, 2014, now Pat. No. 10,114,229.

(51) Int. Cl.
  *G03B 3/10* (2021.01)
  *G03B 5/00* (2021.01)
  *H02K 41/035* (2006.01)

(52) U.S. Cl.
  CPC . *H02K 41/0356* (2013.01); *G03B 2205/0069* (2013.01)

(58) Field of Classification Search
  CPC .......... G02B 27/08; G02B 27/64; G02B 7/02; G02B 7/023; G03B 3/10; G03B 5/00; G03B 5/04; G03B 13/36; H04N 5/2254; H04N 5/2253; H04N 23/54; B60R 2011/008; B60R 2011/0084; H02K 41/031; H02K 41/0356; H02K 11/215; H02K 15/03; H02K 1/2706; H02N 2/026; H02N 2/025; H02N 2/0055; H02N 2/02; H02N 2/04
  See application file for complete search history.

(56) References Cited

U.S. PATENT DOCUMENTS

| | | |
|---|---|---|
| 2007/0047942 A1 | 3/2007 | Chang et al. |
| 2007/0237507 A1 | 10/2007 | Iijima et al. |
| 2008/0292296 A1 | 11/2008 | Ryu et al. |
| 2009/0040361 A1 | 2/2009 | Heim et al. |
| 2010/0309568 A1 | 12/2010 | Takei et al. |
| 2011/0122267 A1 | 5/2011 | Ahn et al. |
| 2011/0205646 A1 | 8/2011 | Sato et al. |
| 2011/0286732 A1 | 11/2011 | Hosokawa et al. |
| 2012/0229901 A1 | 9/2012 | Moriya et al. |
| 2012/0314307 A1* | 12/2012 | Ikushima ................ G02B 7/08 359/814 |
| 2013/0016427 A1 | 1/2013 | Sugawara |
| 2013/0016428 A1 | 1/2013 | Sugawara et al. |
| 2013/0136438 A1 | 5/2013 | Lee et al. |
| 2013/0215511 A1 | 8/2013 | Wu et al. |
| 2013/0293179 A1 | 11/2013 | Lee |
| 2014/0072289 A1 | 3/2014 | Lim et al. |
| 2014/0177056 A1 | 6/2014 | Hayashi et al. |
| 2014/0307319 A1* | 10/2014 | Uno ................ G02B 27/646 359/557 |

FOREIGN PATENT DOCUMENTS

| | | |
|---|---|---|
| CN | 101420076 A | 4/2009 |
| CN | 102047164 A | 5/2011 |
| CN | 102062926 A | 5/2011 |
| CN | 102466942 A | 5/2012 |
| CN | 102629815 A | 8/2012 |
| CN | 102811307 A | 12/2012 |
| CN | 102879973 A | 1/2013 |
| CN | 103091938 A | 5/2013 |
| CN | 103117637 A | 5/2013 |
| CN | 103384109 A | 11/2013 |
| CN | 103454745 A | 12/2013 |
| JP | 2008-112128 A | 5/2008 |
| JP | 2010-14938 A | 1/2010 |
| JP | 2011-65140 A | 3/2011 |
| JP | 2011-085675 A | 4/2011 |
| JP | 2012-88477 A | 5/2012 |
| JP | 2012-518204 A | 8/2012 |
| JP | 2012-177753 A | 9/2012 |
| JP | 2013-24938 A | 2/2013 |
| JP | 2013-24944 A | 2/2013 |
| JP | 2013-134325 A | 7/2013 |
| JP | 2013-228610 A | 11/2013 |
| JP | 2017-509007 A | 3/2017 |
| KR | 10-2008-0082845 A | 9/2008 |
| KR | 10-0939119 B1 | 1/2010 |
| KR | 10-0964541 B1 | 6/2010 |
| KR | 2012-0065491 A * | 6/2012 ............. H04N 23/54 |
| KR | 10-2012-0097117 A | 9/2012 |
| KR | 10-2013-0047268 A | 5/2013 |
| KR | 10-2013-0138975 A | 12/2013 |
| KR | 10-1343197 B1 | 12/2013 |
| WO | WO 2011/021559 A1 | 2/2011 |
| WO | WO 2013/183270 A1 | 12/2013 |
| WO | WO 2015/020000 A1 | 2/2015 |

OTHER PUBLICATIONS

Hao, "Force/Position Control and Application Based on Voice Coil Motor", Huazhong University of Science and Technology, Wuhan, Hubei 430074, P.R. China, May 2008, pp. 1-47 (54 pages total), with an English abstract.

Jimenez et al., "Design of a Prototype Position Actuator for the Primary Mirror Segments of the European Extremely Large Telescope", Proceedings of SPIE, vol. 7733, 2010, pp. 773354-1-773354-14.

* cited by examiner

FIG. 1
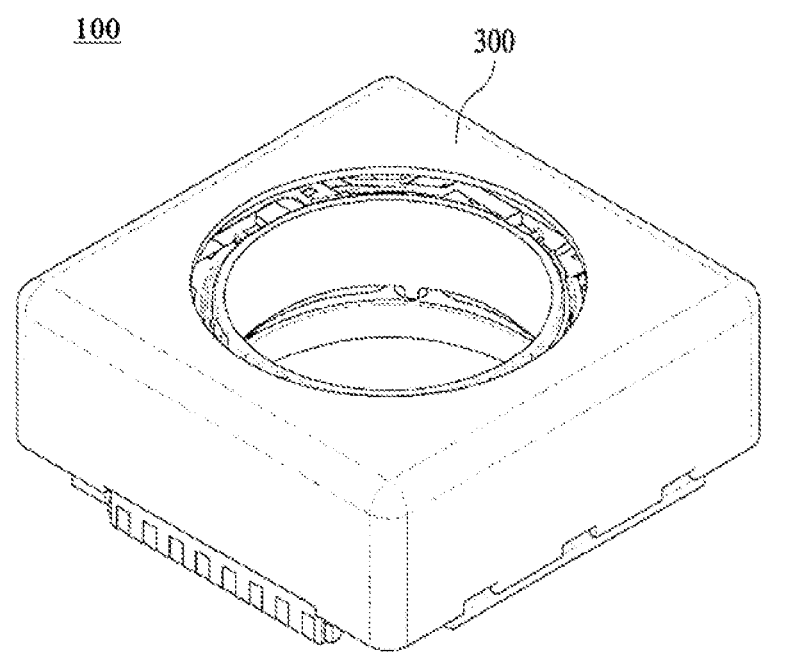
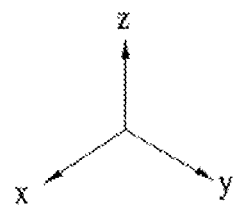

LENS DRIVING DEVICE AND CAMERA MODULE COMPRISING SAME

CROSS REFERENCE PARAGRAPH

This application is a Continuation of U.S. application Ser. No. 16/142,467, filed on Sep. 26, 2018, now U.S. Pat. No. 11,204,510, issued on Dec. 21, 2021, which is a Continuation of U.S. application Ser. No. 15/109,590, filed on Jul. 1, 2016, now U.S. Pat. No. 10,114,229, issued on Oct. 30, 2018, which is the National Phase of PCT International Application No. PCT/KR2014/013066, filed on Dec. 30, 2014, which claims priority under 35 U.S.C. 119 (a) to Patent Application No. 10-2014-0000122, filed in the Republic of Korea on Jan. 2, 2014 and Patent Application No. 10-2014-0089198, filed in the Republic of Korea on Jul. 15, 2014, all of which are hereby expressly incorporated by reference into the present application.

TECHNICAL FIELD

Embodiments relate to a lens driving apparatus and a camera module including the same.

BACKGROUND ART

As various portable terminals become widely used and wireless internet service is commercialized, consumer demand for portable terminals are also diversified. In order to satisfy such demand, various kinds of additional devices are mounted on portable terminals.

Among the additional devices, the representative device for taking an image or video of an object, storing the image data and editing and transmitting the data at a desired time is a camera module.

In recent years, demand for a compact camera module for use in various multimedia fields, including those of personal computers, camera phones, PDAs, smart phones, toys and the like and for use in image input devices of information terminals, monitoring cameras and video tape recorders has increased.

It is difficult to adopt voice coil motor (VCM) technology, which is typically used in conventional camera modules, for use in an ultracompact camera module, which aims at achieving low power consumption, and thus research into the technology has been actively undertaken.

A camera module mounted in a small-sized electronic product, such as a smart phone, may be frequently subjected to shocks during use. In addition, the camera module may minutely shake due to the trembling of the user's hand while taking a photograph. Therefore, there is a high necessity for a technology capable of incorporating a handshake correction unit into the camera module.

Various handshake correction technologies have been recently researched. Among such handshake correction technologies, there is a technology of correcting handshake by moving an optical module in the x-axis and y-axis directions, which define a plane perpendicular to the optical axis. Since the technology is configured such that the optical system is moved and adjusted in the plane perpendicular to the optical axis for image correction, it is complicated and is unsuitable for miniaturization.

Furthermore, there is a demand for accurate and rapid focusing in the optical module.

DISCLOSURE

Technical Problem

Embodiments provide a lens driving apparatus, which includes a sensor capable of accurately detecting displacement of a bobbin at low cost and which is able to implement power saving, miniaturization and improvement of reliability, and a camera module including the same.

Technical Solution

A lens driving apparatus according to an embodiment includes a bobbin accommodating at least one lens therein, a first coil being disposed at an outer circumferential surface thereof, a first magnet disposed near the bobbin so as to face the first coil, a housing for supporting the first magnet, upper and lower elastic members each coupled both to the bobbin and to the housing, a first sensor for detecting displacement of the bobbin in a first direction, a second magnet disposed to face the first sensor, a base disposed so as to be spaced apart from the housing by a predetermined distance, a second coil disposed so as to face the first magnet, a circuit board on which the second coil is mounted, a plurality of support members for supporting the housing such that the housing is movable with respect to the base in second and third directions, which are perpendicular to the first direction, the support members connecting at least one of the upper or lower elastic member to the circuit board, and a second sensor for detecting displacement of the housing with respect to the base in the second and third directions.

The upper elastic member may include at least four first to fourth upper elastic members, which are separated from one another, and the first sensor may be connected to the plurality of support members via the first to fourth upper elastic members.

Each of the first to fourth upper elastic members may include a first inner frame coupled to the bobbin, a first of first outer frame coupled to the housing and connected to the support member, and a first frame connector connecting the first inner frame to the first of first outer frame.

The lower elastic member may include at least two first and second lower elastic members, which are separated from each other, and the first coil may be connected to the plurality of support members via the first and second lower elastic members.

Each of the first and second lower elastic members may include at least one second inner frame coupled to the bobbin, at least one second outer frame coupled to the housing, and a first of second frame connector connecting the at least one second inner frame to the at least one second outer frame.

The at least one second outer frame may include a plurality of second outer frames, and each of the first and second lower elastic members may further include a second of second frame connector connecting the plurality of second outer frames.

The at least four upper elastic members may further include fifth and sixth upper elastic members, which are separated from each other, and each of the fifth and sixth upper elastic members may include a second of first outer frame, which is formed in a direction perpendicular to the first direction and which is coupled to the housing and connected to the support members.

First, each of the first and second lower elastic members may further include a bent portion, which is bent at the second of second frame connector toward the upper elastic member in the first direction. Each of the fifth and sixth upper elastic members may further include a connecting frame connecting the bent portion to the second of first outer frame.

Alternatively, each of the fifth and sixth elastic members may further include a connecting frame, which is bent at the second of first outer frame and extends to the second of second frame connector in the first direction. The bent portion, the connecting frame, and the second of first outer frame may be integrally formed with one another.

Alternatively, each of the first and second lower elastic members may further include a bent portion, which is bent at the second of second frame connector and extends to the second of first outer frame in the first direction.

Alternatively, the lens driving apparatus may further include a metal piece, which is inserted into or attached to the housing, and the second of first outer frame and the third of second frame connector may be connected to each other via the metal piece.

Each of the first and second lower elastic members may further include a coil frame connected to the associated one of two ends of the first coil, and a third of second frame connector connecting the coil frame to the at least one second inner frame.

The first sensor may be disposed, coupled or mounted on the bobbin and moved therewith. The lens driving apparatus may further include a sensor substrate coupled to the bobbin, and the first sensor may be configured to have a shape capable of being disposed, coupled or mounted on the sensor substrate. The first sensor may be disposed, coupled or mounted on an upper side, a lower side, or a center of an outer circumferential surface of the sensor substrate. The sensor substrate may have a mounting recess formed in an outer circumferential thereof, and the first sensor may be fitted into the mounting recess.

The sensor substrate may include a body configured to face an outer circumferential surface of the bobbin, the first sensor being disposed, coupled, or mounted on the body, an elastic member contact protruding from the body in the first direction, and a circuit pattern formed at the body so as to connect a terminal of the first sensor to the elastic member contact. The elastic member contact may be connected to the first to fourth upper elastic members.

The first and second magnets may be formed separately from each other.

The first and second magnets may be integrally formed with each other. The first sensor and the first magnet may be disposed to face each other such that an imaginary center horizontal line, which extends through a center of the first sensor and is perpendicular to an optical axis, is aligned with an upper end of the first magnet. The bobbin may be moved upward and downward in an optical axis direction with respect to a reference point at which the imaginary center horizontal line coincides with the upper end of the first magnet.

The shapes and the number of the plurality of support members may be configured so as to realize symmetry in the second and third directions.

Alternatively, the lower elastic member may include at least four first to fourth lower elastic members, which are separated from one another, and the first sensor may be connected to the plurality of support members via the first to fourth lower elastic members.

Each of the first to fourth lower elastic members may include a first inner frame coupled to the bobbin, a first of first outer frame coupled to the housing and connected to the support members, and a first frame connector connecting the first inner frame to the first of first outer frame.

The upper elastic member may include two first and second upper elastic members, which are separated from each other, and the first coil may be connected to the plurality of support members via the first and second upper elastic members.

Each of the first and second upper elastic members may include at least one second inner frame coupled to the bobbin, at least one second outer frame coupled to the housing, and a first of second frame connector connecting the at least one second inner frame to the at least one second outer frame.

The at least one second outer frame may include a plurality of outer frames, and each of the first and second upper elastic members may further include a second of second frame connector connecting the plurality of second outer frames.

The at least four lower elastic members may further include fifth and sixth lower elastic members, which are separated from each other, and each of the fifth and sixth lower elastic members may include a second of first outer frame, which is formed in a direction perpendicular to the first direction, and which is coupled to the housing and is connected to the support members.

Each of the first and second upper elastic members may further include a bent portion, which is bent at the second of second frame connector toward the lower elastic member in the first direction. Each of the fifth and sixth lower elastic members may further include a connecting frame connecting the bent portion to the second of first outer frame. The bent portion, the connecting frame, and the second of first outer frame may be integrally formed with one another.

Alternatively, each of the fifth and sixth lower elastic members may further include a connecting frame, which is bent at the second of first outer frame and extends to the second of second frame connector in the first direction.

Alternatively, each of the first and second upper elastic members may further include a bent portion, which is bent at the second of second frame connector and extends to the second of first outer frame in the first direction.

Alternatively, the lens driving apparatus may further include a metal piece, which is inserted into or attached to the housing, and the second of first outer frame and the third of second frame connector may be connected to each other via the metal piece.

Each of the first and second upper elastic members may further include a coil frame connected to an associated one of two ends of the first coil, and a third of second frame connector connecting the coil frame to the at least one second inner frame.

A lens driving apparatus according to another embodiment includes a mover including a bobbin for holding a lens unit and a coil disposed on an outer surface of the bobbin, a stator for supporting the mover, a first sensor disposed on the outer surface of the bobbin so as to detect movement of the bobbin, and an elastic member including a first elastic part and a second elastic member, the first elastic part being connected at respective ends thereof to first sides of the bobbin and the stator so as to allow power to be applied to the coil, and a second elastic part being connected at respective ends thereof to second sides of the bobbin and the stator so as to be conductively connected to the first sensor.

The first elastic part may be disposed at an upper side of the bobbin, and the second elastic part may be disposed at a lower side of the bobbin. Alternatively, the first elastic part may be disposed at a lower side of the bobbin, and the second elastic part may be disposed at an upper side of the bobbin.

Each of the first and second elastic parts may include an outer portion coupled to the mover, an inner portion coupled to the bobbin, and a connecting portion connecting the outer portion to the inner portion and providing elastic force.

The first elastic part may be constituted by a first spring and a second spring, which are disposed so as to be spaced apart from each other.

Each of the first and second springs may include a terminal, which is bent at the outer portion thereof and is soldered to the substrate.

The first spring and the second spring may be constituted by leaf springs, which are configured to be symmetrical with each other.

The second elastic part may be constituted by at least two leaf springs so as to match the number of terminals of the first sensor.

At least one of the first or second elastic part may be configured to have a shape that is symmetrical in a direction perpendicular to a direction in which the mover is moved.

The stator may include a magnet unit disposed at a position corresponding to the coil, a housing for holding the magnet unit, and a base for supporting the mover and the housing.

A camera module according to a further embodiment includes the lens driving apparatus, and an image sensor. For example, the camera module may include a mover including a bobbin for holding a lens unit and a coil disposed on an outer surface of the bobbin, a stator for supporting the mover, a first sensor disposed on the outer surface of the bobbin so as to detect movement of the bobbin, an elastic member including a first elastic part and a second elastic member, the first elastic part being connected at respective ends thereof to first sides of the bobbin and the stator so as to allow power to be applied to the coil, and a second elastic part being connected at respective ends thereof to second sides of the bobbin and the stator so as to be conductively connected to the first sensor, a substrate conductively connected to the elastic member, an image sensor provided at the substrate, and a cover can accommodating the mover and the stator and defining the appearance of the camera module.

The second elastic part may be constituted by at least two leaf springs so as to match the number of terminals of the first sensor.

The first elastic part may include two leaf springs, which are first and second springs spaced apart from each other.

Advantageous Effects

The lens driving apparatus and a camera module including the same according to the embodiments are able to accurately sense displacement of a bobbin without causing tilting of the bobbin even though a sensor for sensing displacement of the bobbin is used, and are able to prevent an increase in the number of parts and to reduce the weight of the housing so as to improve responsiveness. Furthermore, the lens driving apparatus and a camera module including the same enable the realization of miniaturization, weight savings and low power consumption by directly disposing the first sensor on the bobbin, compared to a conventional technology in which a magnet is disposed on a bobbin, and are able to improve reliability by using the elastic member as a conductive connection member of the terminals of the first sensor.

DESCRIPTION OF DRAWINGS

FIG. 1 is a schematic perspective view showing a lens driving apparatus according to an embodiment;

BEST MODE

Figure 2:
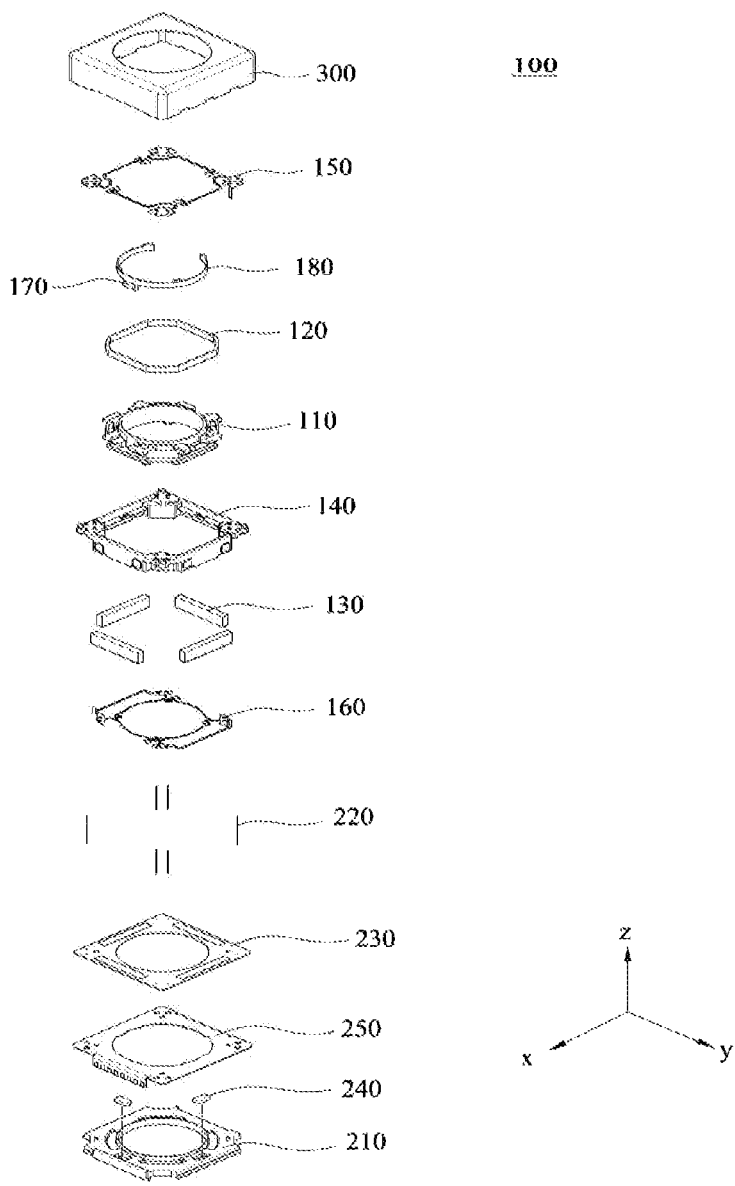
FIG. 2 is an exploded perspective view showing the lens driving apparatus according to the embodiment.

Hereinafter, exemplary embodiments will be described in detail with reference to the accompanying drawings to aid in understanding of the embodiments. However, the embodiments may be altered in various ways, and the scope of the embodiments should not be construed as being limited to the following description. The embodiments are intended to provide those skilled in the art with more complete explanation.

In the following description of the embodiments, it will be understood that, when each element is referred to as being formed "on" or "under" the other element, it can be directly "on" or "under" the other element, or can be indirectly formed with one or more intervening elements therebetween. In addition, it will also be understood that "on" or "under" the element may mean an upward direction and a downward direction based on the element.

In addition, the relative terms "first", "second", "top/upper/above", "bottom/lower/under" and the like in the description and in the claims may be used to distinguish between any one substance or element and other substances or elements and not necessarily for describing any physical or logical relationship between the substances or elements or a particular order.

In the drawings, the dimensions of layers may be exaggerated, omitted or illustrated schematically for clarity and convenience of description. In addition, the dimensions of constituent elements do not precisely reflect the actual dimensions.

Hereinafter, a lens driving apparatus 100 or 400 according to an embodiment will be described with reference to the accompanying drawings. For the convenience of description, although the lens driving apparatus 100 or 400 according to the embodiment is described using a Cartesian coordinates system (x, y, z), the lens driving apparatus 100 or 400 may be described using some other coordinate systems, and the embodiment is not limited thereto. In the respective drawings, the x-axis and the y-axis mean directions perpendicular to an optical axis, i.e., the z-axis, and the optical axis (Z-axis) direction may be referred to as a "first direction", the x-axis direction may be referred to as a "second direction", and the y-axis direction may be referred to as a "third direction".

An Embodiment

A handshake correction apparatus, which is applied to compact camera modules of mobile devices such as smart phones or tablet PCs, may mean an apparatus configured to prevent the contour of an image captured when taking a still image from not being clearly formed due to vibrations caused by the trembling of the user's hand.

In addition, an autofocusing apparatus is configured to automatically focus the subject image on the surface of an image sensor. The handshake correction apparatus and the autofocusing apparatus may be configured in various manners. The lens driving apparatus 100 according to the embodiments may perform the handshake correction and/or autofocusing operations in such a manner as to move an optical module, composed of at least one lens, in a first direction parallel to the optical axis and/or in a plane defined by the second and third directions, which are perpendicular to the first direction.

FIG. 1 is a schematic perspective view showing a lens driving apparatus 100 according to one embodiment. FIG. 2 is an exploded perspective view of the lens driving apparatus 100 shown in FIG. 1.

Referring to FIGS. 1 and 2, the lens driving apparatus 100 according to the embodiment may include a first lens driving unit, a second lens driving unit, and a cover member 300.

The first lens driving unit may serve as the above-mentioned autofocusing apparatus. In other words, the first lens driving unit may serve to move a bobbin 110 in the first direction by virtue of the interaction between a magnet 130 and a first coil 120.

The second lens driving unit may serve as the handshake correction apparatus. In other words, the second lens driving unit may serve to move all or a portion of the first lens driving unit in the second and third directions by virtue of the interaction between the magnet 130 and the second coil 230.

The cover member 300 may be configured to have an approximate box shape so as to accommodate the first and second lens driving units therein.

Figure 3:
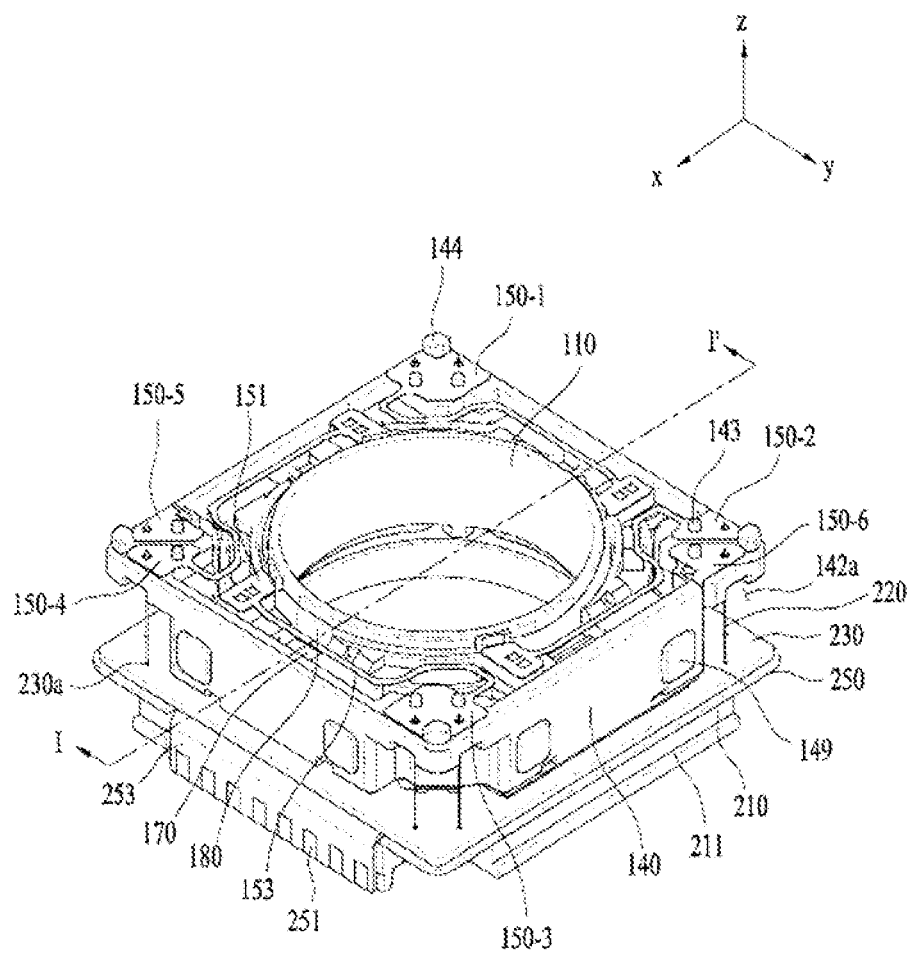
FIG. 3 is a perspective view showing a lens driving apparatus according to the embodiment, from which a cover member, illustrated in FIGS. 1 and 2, is removed.

FIG. 3 is a perspective view showing the lens driving apparatus according to the embodiment, from which the cover member 300 shown in FIGS. 1 and 2 is removed.

The first lens driving unit may include the bobbin 110, the first coil 120, the magnet 130, a housing 140, an upper elastic member 150, a lower elastic member 160, a first sensor 170 and a sensor substrate 180.

Figure 4:
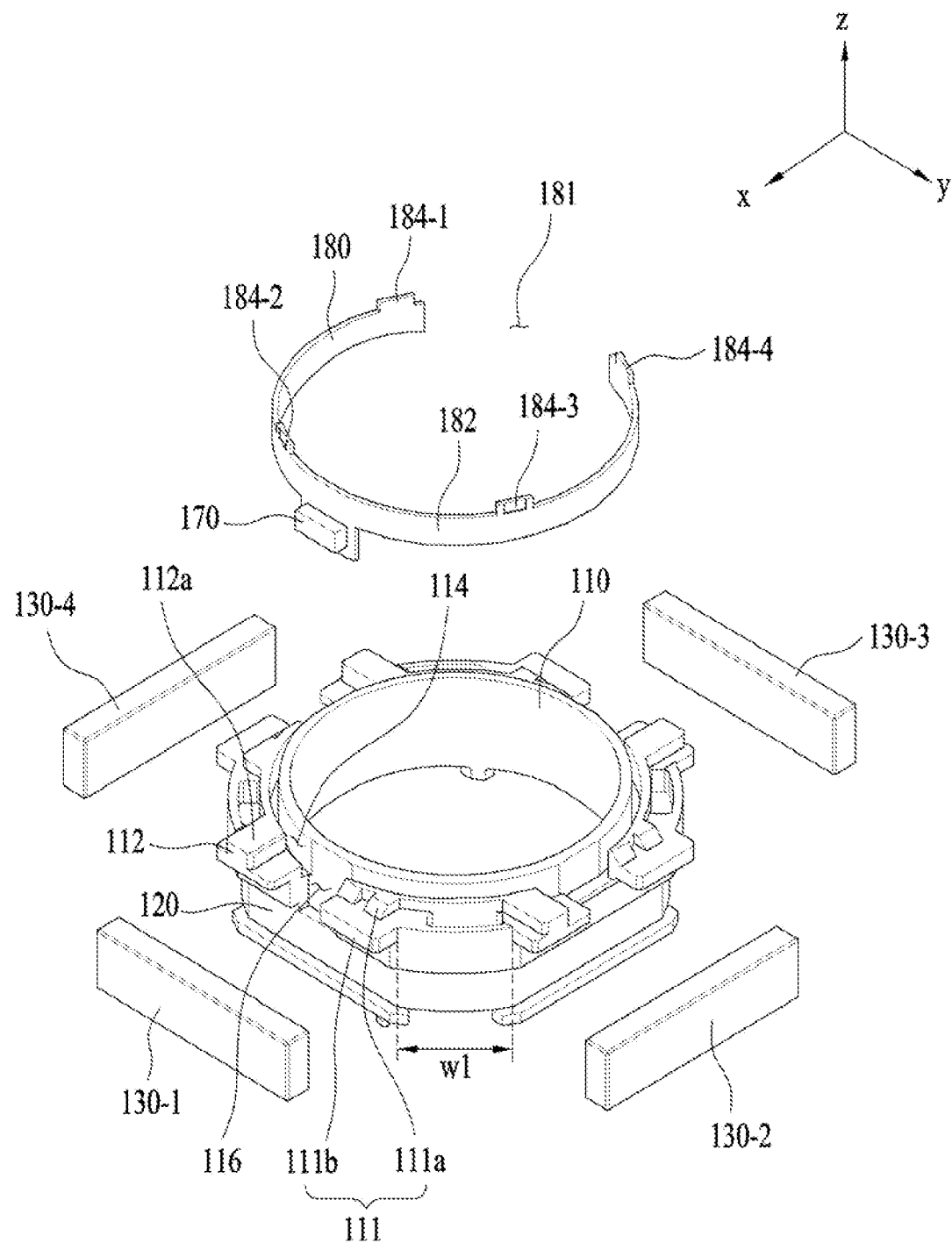
FIG. 4 is an exploded perspective view of the lens driving apparatus according to the embodiment, which shows the bobbin, the first coil, the magnet, the first sensor and the sensor substrate.

FIG. 4 is an exploded perspective view of the lens driving apparatus according to the embodiment, which shows the bobbin 110, the first coil 120, the magnet 130 (130-1, 130-2, 130-3 and 130-4), the first sensor 170 and the sensor substrate 180.

Figure 5A:
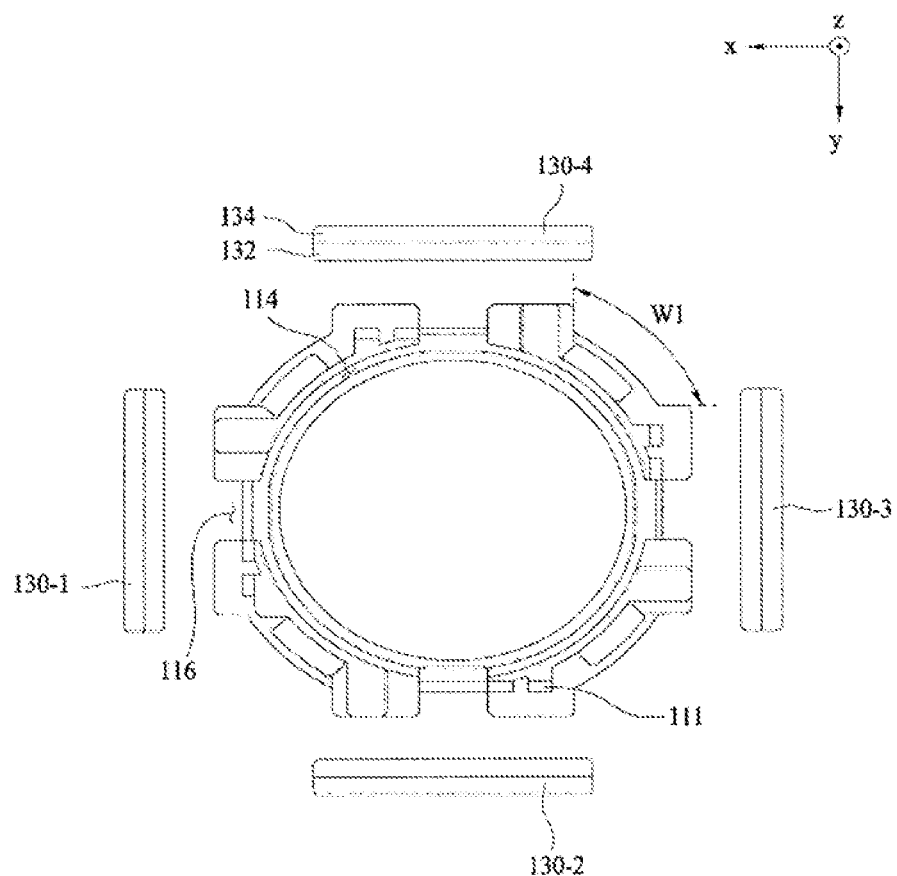
FIG. 5a is a plan view showing the bobbin and the magnet shown in FIG. 4.
Figure 5B:
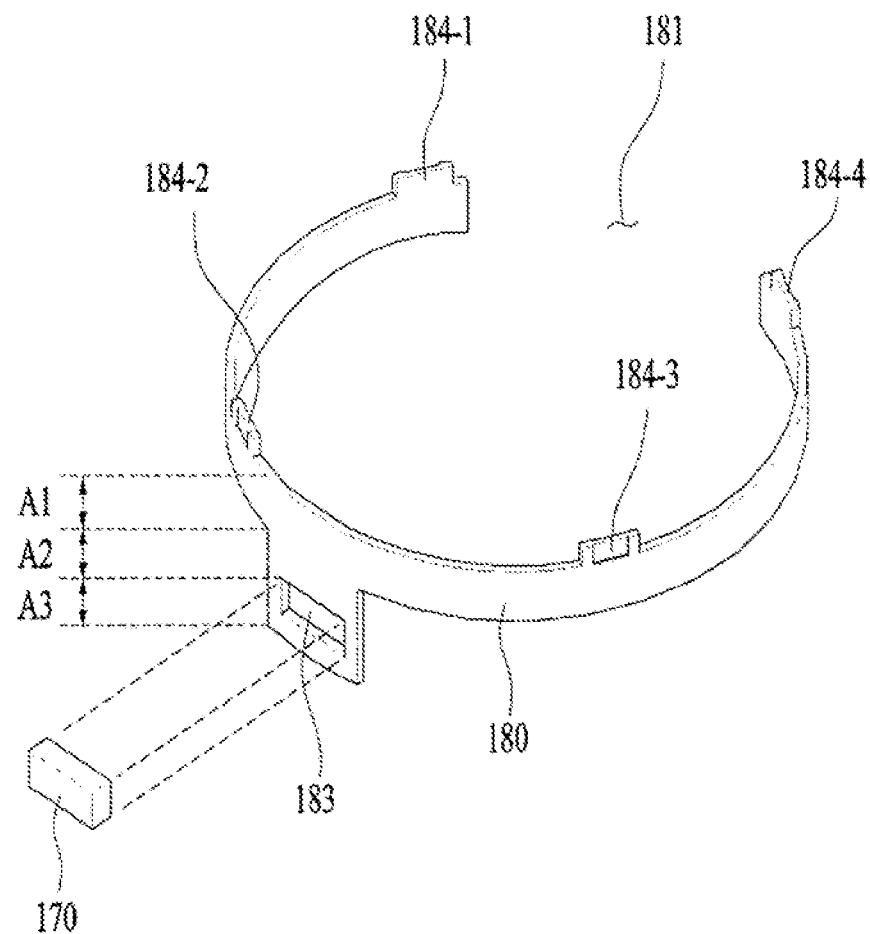
FIG. 5b is a perspective view showing another embodiment of the sensor substrate shown in FIG. 4.
Figure 5C:
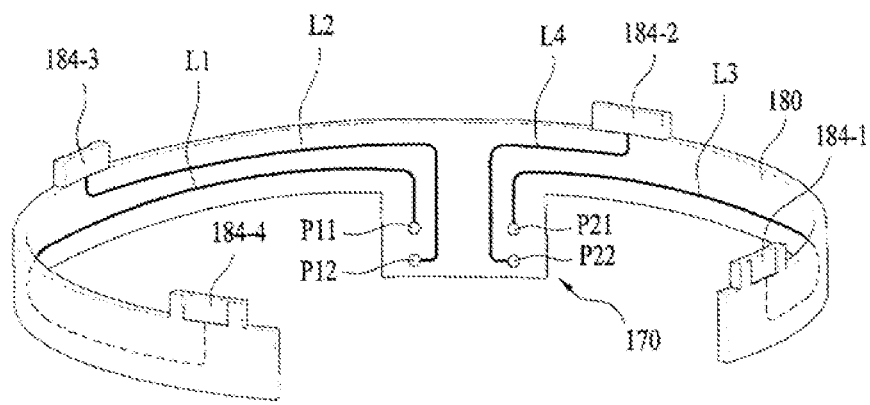
FIG. 5c is a rear perspective view showing one embodiment of the first sensor and the sensor substrate shown in FIG. 4.

FIG. 5*a* is a plan view showing the bobbin 110 and the magnet 130 (130-1, 130-2, 130-3 and 130-4) shown in FIG. 4. FIG. 5*b* is a perspective view showing another embodiment of the sensor substrate 180 shown in FIG. 4. FIG. 5*c* is a rear perspective view showing one embodiment of the first sensor 170 and the sensor substrate 180 shown in FIG. 4.

Referring to the above-mentioned drawings, the bobbin 110 may be disposed in the internal space defined in the housing 140 so as to reciprocate in the first direction, which is the optical axis direction, or in a direction parallel to the first direction. As shown in FIG. 4, the bobbin 110 may be provided therearound with the first coil 120 such that the first coil 120 and the magnet 130 interact with each other in an electromagnetic manner. To this end, the magnet 130 may be disposed around the bobbin 110 so as to face the first coil 120.

When the bobbin 110 performs the upward and/or downward movement in the first direction, which is the optical axis direction, or in a direction parallel to the first direction to fulfill the autofocusing function, the bobbin 110 may be elastically supported by means of the upper and lower elastic members 150 and 160. To this end, the upper and lower elastic members 150 and 160 may be coupled to the bobbin 110 and the housing 140, as will be described later.

Although not shown in the drawings, the lens driving apparatus may include a lens barrel (not shown), which is provided on the inner side surface (i.e., the inner surface) of the bobbin 110 and on which at least one lens is mounted. The lens barrel may be mounted on the inner surface of the bobbin 110 in various ways. For example, the lens barrel may be directly secured to the interior of the bobbin 110, or a single lens may be integrally formed with the bobbin 110 without using the lens barrel. The lens mounted on the lens barrel may include a single lens, or may include two or more lenses, which constitute an optical system.

According to another embodiment, although not shown in the drawings, the bobbin 110 may be provided on the inner circumferential surface thereof with a female threaded portion while the lens barrel may be provided on the outer circumferential surface thereof with a male threaded portion corresponding to the female threaded portion such that the lens barrel is coupled to the bobbin 110 by virtue of threaded engagement between the female and male threaded portions. However, the embodiments are not limited thereto. According to a further embodiment, the bobbin 110 and the lens barrel may be coupled to each other using an adhesive without using the threaded engagement. In this case, after the threaded engagement, the bobbin 110 and the lens barrel may also be reliably coupled to each other using an adhesive.

The bobbin 110 may include first and second protrusions 111 and 112.

The first protrusion 111 may include a guide portion 111*a* and a first stopper 111*b*. The guide portion 111*a* may serve to guide the installation of the upper elastic member 150 at a predetermined position. For example, the guide portion 111a may guide the passage of a first frame connector 153 of the upper elastic member 150, as shown in FIG. 3. To this end, depending on the embodiment, a plurality of guide portions 111a may protrude in the second and third directions, which are perpendicular to the first direction. The guide portions 111a may be provided in a plane defined by the x axis and the y axis so as to be symmetrical about the center point of the bobbin 110, as shown in the drawings, or may be provided so as to be asymmetrical about the center point of the bobbin 110 so as not to interfere with other components, unlike the embodiment shown in the drawings.

The second protrusion 112 may protrude in the second and third directions, which are perpendicular to the first direction. The upper surfaces 112a of the second protrusions 112 may be configured such that a first inner frame 151 of the upper elastic member 150, which will be described later, is mounted thereon.

Figure 6:
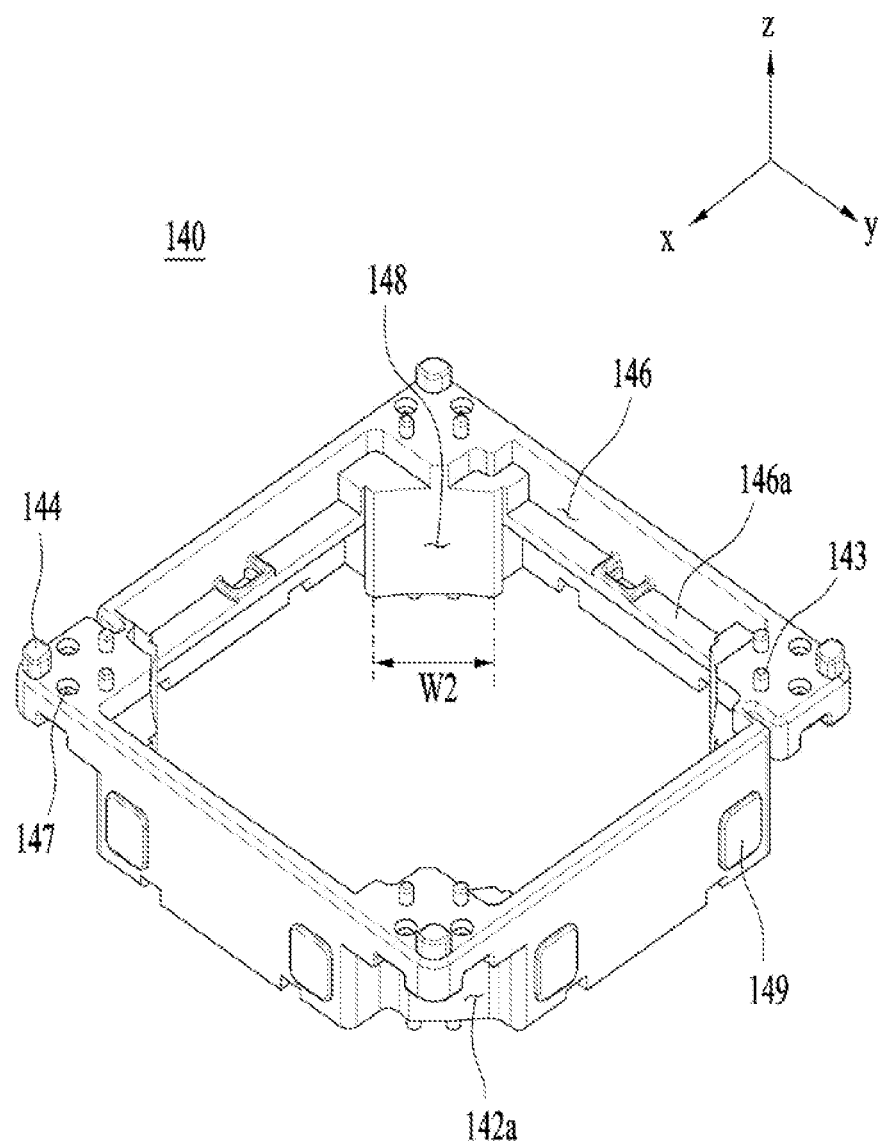
FIG. 6 is a top perspective view of the housing according to the embodiment.
Figure 7:
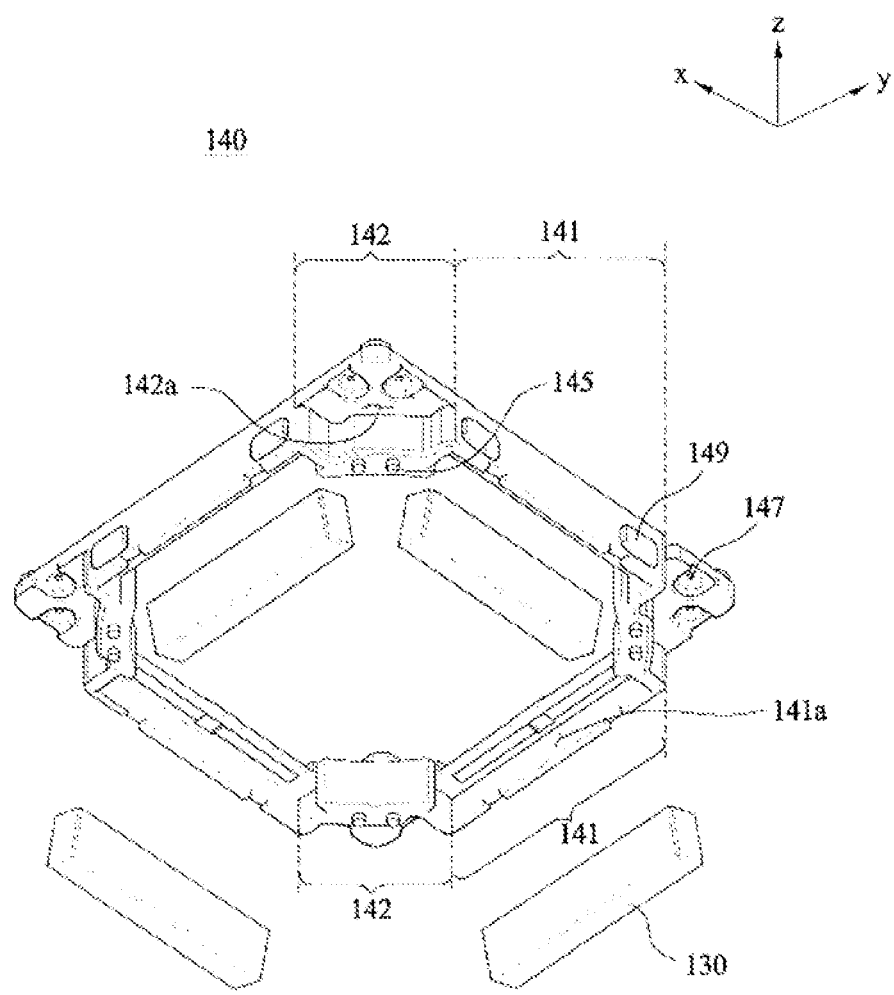
FIG. 7 is a bottom exploded perspective view of the housing and the magnet according to the embodiment.

FIG. 6 is a top perspective view of the housing 140 according to the embodiment. FIG. 7 is a bottom exploded perspective view of the housing 140 and the magnet 130 according to the embodiment.

Referring to FIG. 6, the housing 140 may include first mounting recesses 146, which are formed at positions corresponding to those of the first and second protrusions 111 and 112.

When the bobbin 110 moves in the first direction, which is the optical axis direction, or in a direction parallel to the first direction for the autofocusing function, the first stoppers 111b of the first protrusions 111 and the second protrusions 112 serve to prevent the bottom surface of the body of the bobbin 110 from directly colliding with the upper surfaces of a base 210 and a circuit board 250 even when the bobbin 110 moves beyond a predetermined range due to an external impact or the like. To this end, the first stoppers 111b may protrude from the outer circumferential surface of the bobbin 110 in a radial direction, that is, in the second or third direction, so as to be longer than the guide portions 111a, and the second protrusions 112 may also protrude in the lateral direction so as to be larger than the upper surfaces thereof, on which the upper elastic member 150 is mounted.

Referring to FIG. 6, when the state in which the bottom surfaces of the first and second protrusions 111 and 112 are in contact with the bottom surfaces 146a of the first mounting recesses 146 is set be the initial position, the autofocusing function may be controlled as in the unidirectional control of a conventional voice coil motor (VCM). Specifically, the autofocusing function may be fulfilled in a manner such that the bobbin 110 is raised when current is supplied to the first coil 120 and is lowered when the supply of current is interrupted.

However, when the state in which the bottom surfaces of the first and second protrusions 111 and 112 are spaced apart from the bottom surfaces 146a of the first mounting recesses 146 by a predetermined distance is set to be the initial position, the autofocusing function may be controlled in accordance with the direction of current, as in the bidirectional control of a conventional voice coil motor. Specifically, the autofocusing function may be fulfilled by moving the bobbin 110 in upward or downward direction parallel to the optical axis. For example, the bobbin 110 may be moved upward upon the application of forward current and may be moved downward upon the application of reverse current.

The housing 140 may include third protrusions 148, which have the convex shape at positions corresponding to spaces each having a first width W1, which are defined between the first and second protrusions 111 and 112. The surfaces of the third protrusions 148 that face the bobbin 110 may have the same shape as the side surface of the bobbin 110. At this point, the first width W1 between the first and second protrusions 111 and 112, shown in FIG. 4, and the second width W2 between the third protrusions 148, shown in FIG. 6, may be set to have a predetermined tolerance therebetween. Accordingly, the rotation of the third protrusions 148 between the first and second protrusions 111 and 112 may be restricted. As a result, even if the bobbin 110 is subjected to a force tending to rotate the bobbin 110 about the optical axis rather than a force tending to move the bobbin 110 in the optical axis direction, it is possible to prevent the rotation of the bobbin 110 by means of the third protrusions 148.

According to the embodiment, the first sensor 170 may be disposed, coupled or mounted on the bobbin 110, and may thus be moved together with the bobbin 110. The first sensor 170 may detect(or, sense) displacement of the bobbin 110 in the first direction, which is the optical axis direction or in a direction parallel to the first direction, and may output the result of the detection as a feedback signal. By using the result of the detection, which is obtained by detecting displacement of the bobbin 110 in the first direction or in a direction parallel to the first direction using the feedback signal, the displacement of the bobbin 110 in the first direction or a direction parallel to the first direction may be adjusted.

The first sensor 170 may be disposed, coupled or mounted on the bobbin 110 or the housing 140 in various manners, and may receive current in various fashions depending on the manner in which the first sensor 170 is disposed, coupled or mounted.

According to one embodiment, the first sensor 170 may be coupled to the housing 140, and an additional sensor magnet (not shown), which faces the first sensor 170, may be disposed on the bobbin 110. The first sensor 170 may be disposed, coupled or mounted on side surfaces or corners of the first mounting recess 146 of the housing 140 shown in FIG. 6 (for example, the surface of the third protrusion 148). In this case, by the magnetic force which is exerted on the magnet 130 from the additional sensor magnet, the bobbin 110, which is moved in the first direction, that is, the optical axis direction, or a direction parallel to the first direction, may be tilted, and the accuracy of the feedback signal may be deteriorated. In consideration of this, another additional sensor magnet may be disposed, coupled or mounted on the bobbin 110 at a position at which the interaction between the first additional sensor magnet and the magnet 130 is minimized.

According to another embodiment, the first sensor 170 may be directly disposed, coupled or mounted on the outer circumferential surface of the bobbin 110. In this case, surface electrodes (not shown) may be provided on the outer circumferential surface of the bobbin 110, and the first sensor 170 may receive current through the surface electrodes.

According to a still further embodiment, the first sensor 170 may be indirectly disposed, coupled or mounted on the bobbin 110, as shown in the drawings. For example, the first sensor 170 may be disposed, coupled or mounted on the sensor substrate 180, and the sensor substrate 180 may be coupled to the bobbin 110. In other words, the first sensor 170 may be indirectly disposed, coupled or mounted on the bobbin 110 through the sensor substrate 180.

When the first sensor 170 is directly or indirectly disposed on the bobbin 110, as in the further and still further embodiments, the sensor magnet may be disposed independently from the magnet 130, and the magnet 130 may be used as the sensor magnet.

Hereinafter, although the case in which the first sensor 170 is indirectly disposed, coupled or mounted on the bobbin 110 through the sensor substrate 180 and in which the magnet 130 is used as the sensor magnet will be described, the embodiments are not limited thereto.

Referring to FIGS. 4 and 5a, the bobbin 110 may be provided in the outer side surface thereof with a support groove 114, and the sensor substrate 180 may be fitted into the support groove 114 so as to be coupled to the bobbin 110. Although the sensor substrate 180 may have, for example, a ring shape, as shown in the drawings, the embodiments are not limited as to the shape of the sensor substrate 180. The support groove 114 may be defined between the outer circumferential surface of the bobbin 110 and the first and second protrusions 111 and 112. At this point, the first sensor 170 may have a shape capable of being disposed, coupled or mounted on the sensor substrate 180. As shown in FIGS. 4 and 5b, the first sensor 170 may be disposed, coupled or mounted on, for example, an upper area A1, an intermediate area A2 and a lower area A3 of the outer circumferential surface of the sensor substrate 180 in various manners. The first sensor 170 may receive current from the outside through the circuit of the sensor substrate 180. For example, a mounting hole 183 may be formed in the outer circumferential surface of the sensor substrate 180, and the first sensor 170 may be disposed, coupled or mounted in the mounting hole 183, as shown in FIG. 5b. At least one surface of the mounting hole 183 may be configured to have an inclined surface tapered(not shown) so as to allow more efficient injection of epoxy or the like for assembly of the first sensor 170. Although additional epoxy or the like may not be injected into the mounting hole 183, the epoxy or the like may be injected so as to increase the disposition stability, coupling force and/or mounting force of the first sensor 170.

Alternatively, the first sensor 170 may be attached to and supported by the outer front surface of the sensor substrate 180 by means of an adhesive, such as epoxy or double-sided adhesive tape, as shown in FIG. 4. As illustrated in FIG. 4, the first sensor 170 may be disposed, coupled or mounted on the center of the sensor substrate 180.

The bobbin 110 may have a reception recess 116, which is suitable for receiving the first sensor 170, which is disposed, coupled or mounted on the sensor substrate 180. The reception recess 116 may be formed in a space between the first and second protrusions 111 and 112.

The sensor substrate 180 may include a body 182, elastic member contacts 184-1, 184-2, 184-3, and 184-4, and circuit patterns L1, L2, L3, and L4.

When the support groove 114, which is defined between the outer circumferential surface of the bobbin 110 and the first and second protrusions 111 and 112, has the same shape as the outer circumferential surface of the bobbin 110, the body 182 of the sensor substrate 180 may have a shape capable of being inserted to be securely fitted into the support groove 114. Although the support groove 114 and the body 182 may have a circular plane view shape, as shown in FIG. 3 to FIG. 5a, the embodiments are not limited thereto. According to another embodiment, the support groove 114 and the body 182 may have a polygonal plane view shape.

The body 812 of the sensor substrate 180 may include a first segment, on the outer circumferential surface of which the first sensor 170 is disposed, coupled or mounted, and a second segment, which contacts the first segment and extends therefrom. Although the sensor substrate 180 may have an opening 181 in a region facing the first segment so as to be easily fitted into the support groove 114, the embodiments are not limited to a sensor substrate 180 having any specific shape.

The elastic member contacts 184-1, 184-2, 184-3, and 184-4 may protrude from the body 182 in a direction which allows the elastic member contacts 184-1, 184-2, 184-3, and 184-4 to contact the first frame 151, for example, in the first direction, that is, the optical axis direction, or in a direction parallel to the first direction. The elastic member contacts 184-1, 184-2, 184-3, and 184-4 are the portions that are connected to the first inner frame 151 of the upper elastic member 150, which will be described later.

The circuit patterns L1, L2, L3, and L4 may be formed on the body 182, and may conductively connect the first sensor 170 and the elastic member contacts 184-1, 184-2, 184-3, and 184-4. For example, the first sensor 170 may be embodied as a Hall sensor, but may alternatively be embodied as any kind of sensor as long as it is able to detect variation in magnetic force.

If the first sensor 170 is embodied as a Hall sensor, the Hall sensor 170 may have a plurality of pins. For example, the plurality of pins may include a first pin and a second pin. Referring to FIG. 5c, the first pin may include, for example, a first of first pin P11 and a second of first pin P12, which are respectively connected to the voltage and to ground, and the second pin may include a first of second pin P21 and a second of second pin P22, which output the result of the detection. At this point, although the result of the detection, that is, the feedback signal which is output through the first of second pin P21 and the second of second pin P22, may be of a current type, the embodiments are not limited as to the kind of feedback signal.

The first of first, second of first, first of second and second of second pins P11, P12, P21, and P22 of the first sensor 170 may be conductively connected to the elastic member contacts 184-1, 184-2, 184-3, and 184-4 through the circuit patterns L1, L2, L3, and L4, respectively. Referring to FIG. 5c, the first of first, second of first, first of second, and second of second pins P11, P12, P21, and P22 may be connected to the fourth, third, second, and first elastic member contacts 184-1, 184-3, 184-2, and 184-1 through the circuit patterns, that is, the first, second, third, and fourth lines L1, L2, L3, and L4, respectively. According to one embodiment, the first, second, third, and fourth lines L1, L2, L3, and L4 may be constructed so as to be visible to the naked eye. According to another embodiment, the first, second, third, and fourth lines L1, L2, L3, and L4 may be formed in the body 182 so as to be invisible to the naked eye.

Figure 8:
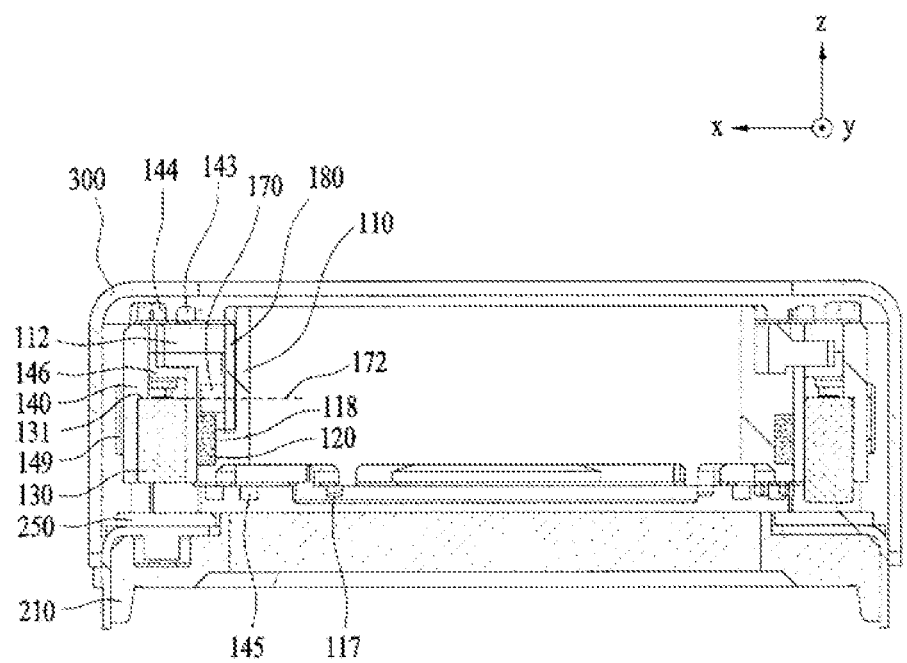
FIG. 8 is a cross-sectional view taken along line I-I' of FIG. 3.

FIG. 8 is a cross-sectional view taken along line I-I' of FIG. 3.

Referring to FIG. 8, the first sensor 170 may be disposed to face the magnet 130 such that the imaginary center horizontal line 172, which extends through the center of the first sensor 170 in the optical axis direction and which is formed in the direction perpendicular to the optical axis, is aligned with the upper end 131 of the magnet 130.

At this point, although the bobbin 110 may be moved upward and downward in the optical axis direction, that is, in the first direction or in a direction parallel to the first direction with respect to the reference point at which the imaginary center horizontal line 172 coincides with the upper end 131 of the first magnet 130, the embodiments are not limited thereto.

Figure 9:
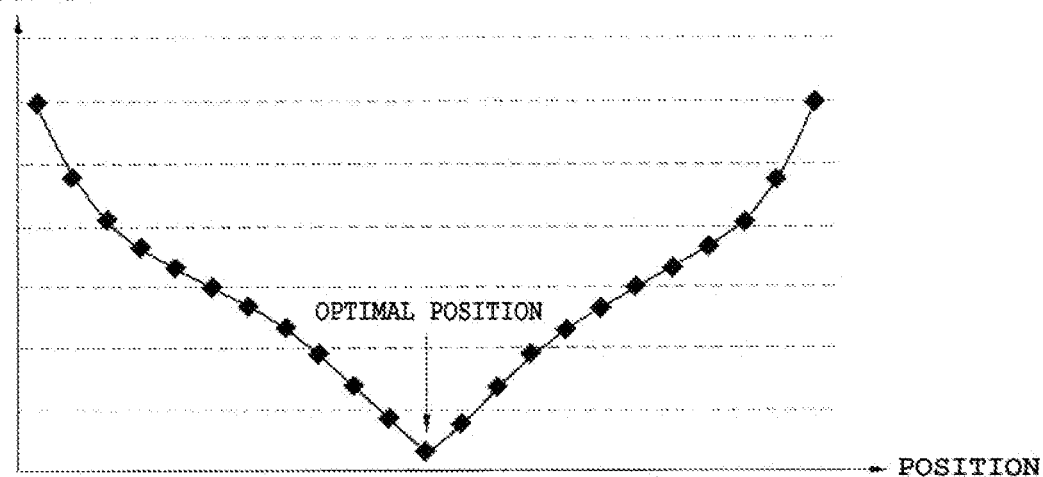
FIG. 9 is a graph illustrating the accuracy of the first sensor according to the optimal position of the first sensor.

FIG. 9 is a graph illustrating the accuracy of the first sensor 170 according to the optimal position of the first sensor 170, in which the horizontal axis represents the position of the first sensor 170 and the vertical axis represents the accuracy of the first sensor 170.

Referring to FIGS. 8 and 9, it will be appreciated that the accuracy of detection by the first sensor 170 is maximized when the imaginary center horizontal line 172 coincides with the upper end 131 of the magnet 130.

Figure 10:
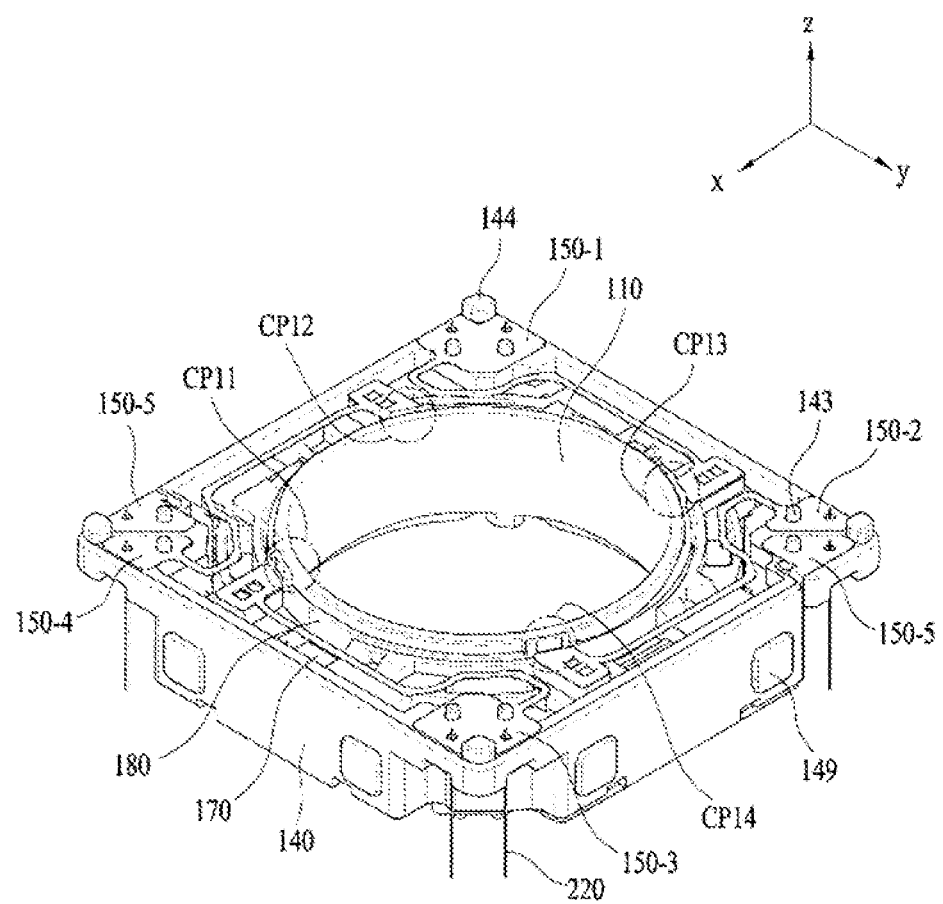
FIG. 10 is a top perspective view of the bobbin, the housing, the upper elastic member, the first sensor, the sensor substrate and a plurality of support members, all of which are coupled to one another.

FIG. 10 is a top perspective view of the bobbin 110, the housing 140, the upper elastic member 150, the first sensor 170, the sensor substrate 180 and a plurality of support members 220, all of which are coupled to one another.

Figure 11:
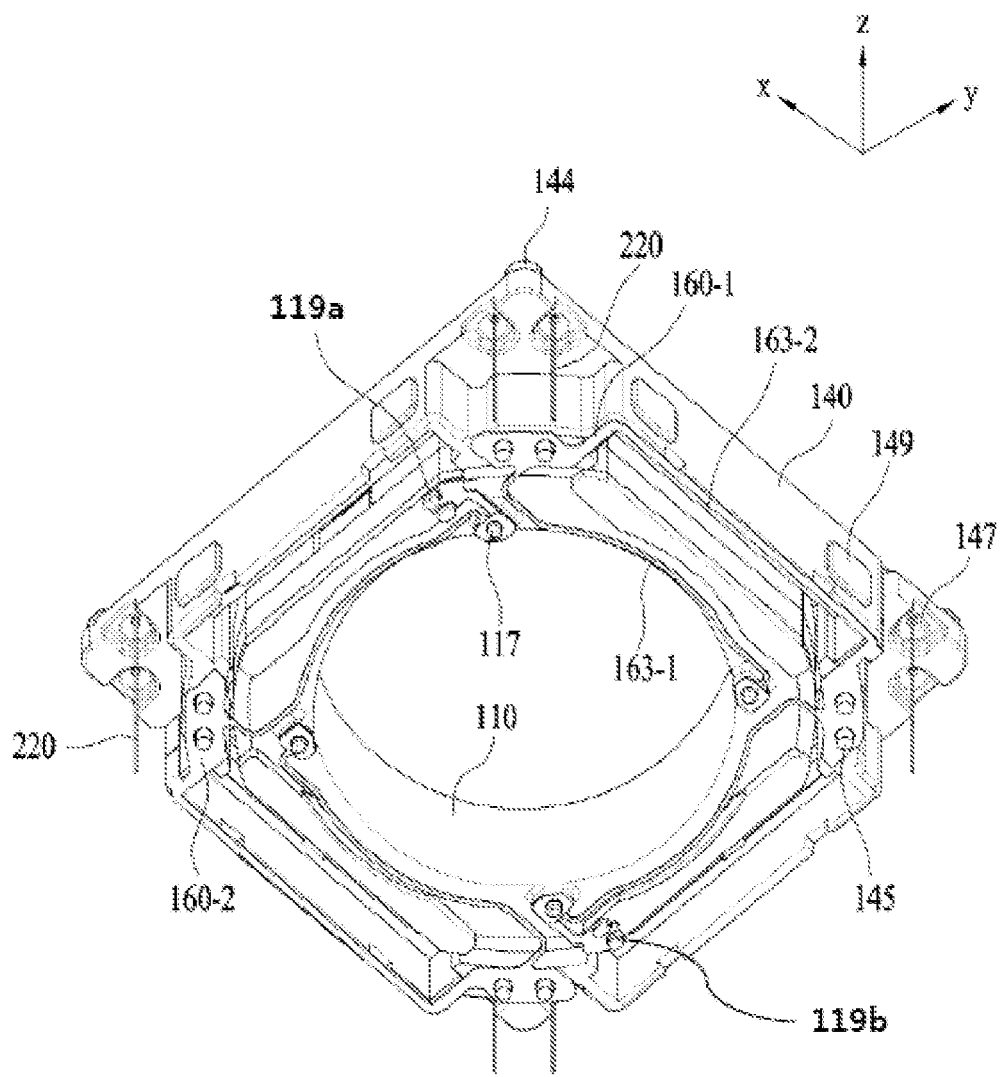
FIG. 11 is a bottom perspective view of the bobbin, the housing, the lower elastic member and the plurality of support members, all of which are coupled to one another.

FIG. 11 is a bottom perspective view of the bobbin 110, the housing 140, the lower elastic member 160, and the plurality of support members 220, all of which are coupled to one another.

The first coil 120 may be wound around the outer circumferential surface of the bobbin 110 by a worker or a machine, and then both ends, that is, the starting line and the ending line of the first coil 120, may be respectively wound around a pair of winding protrusions 119a and 119b protruding from the bottom surface of the bobbin 110 in the first direction, and may be secured thereto. At this time, the position of the ending line of the first coil 120, which is wound around the winding protrusion 119a (or 119b), may vary depending on the worker. As illustrated in FIG. 11, although the pair of winding protrusions 119a and 119b may be disposed at positions that are symmetrical about the center of the bobbin 110, the embodiments are not limited thereto.

As illustrated in FIG. 8, the first coil 120 may be fitted and coupled in a coil groove 118, which is formed in the outer surface of the bobbin 110. As illustrated in FIG. 2, although the first coil 120 may be embodied as an angled coil block having a ring shape, the embodiments are not limited thereto. According to another embodiment, the first coil 120 may be directly wound around the outer circumferential surface of the bobbin 110, or may be wound through a coil ring (not shown). The coil ring may be coupled to the bobbin 110 in the same manner as the manner in which the sensor substrate 180 is inserted and fixed in the support groove 114, and the first coil 120 may be wound around the coil ring rather than being wound or disposed around the outer surface of the bobbin 110. In any case, the starting line and the ending line of the first coil 120 may be respectively wound around the winding protrusions 119a and 119b and secured thereto, and the other constructions may be the same.

As shown in FIG. 2, the first coil 120 may be configured to have an approximately octagonal shape. The first coil 120 has a shape corresponding to the outer circumferential surface of the bobbin 110 having an octagonal shape, as illustrated in FIG. 5a. At least four of the surfaces of the first coil 120 may be configured to be linear, and the corner surfaces connecting the four surfaces may also be configured to be linear. However, the embodiments are not limited thereto, and the surfaces may be configured to be rounded.

The linear surfaces of the first coil 120 may be configured to correspond to the magnets 130. The surfaces of the magnets 130, which correspond to the surfaces of the first coil 120, may have the same radius of curvature as the surfaces of the first coil 120. Specifically, the surfaces of the magnets 130 corresponding to the surfaces of the first coil 120 may be linear when the surfaces of the first coil 120 are linear, whereas the surfaces of the magnets 130 corresponding to the surfaces of the first coil 120 may be rounded when the surfaces of the first coil 120 are rounded. However, even if the surfaces of the first coil 120 are rounded, the surfaces of the magnets 130 corresponding to the surfaces of the first coil 120 may be linear, and vice versa.

The first coil 120, which is intended to move the bobbin 110 in the first direction, which is parallel to the optical axis, or in a direction parallel to the first direction so as to fulfill the autofocusing function, may generate electromagnetic force through the interaction with the magnets 130 upon the supply of current. The generated electromagnetic force may move the bobbin 110 in the first direction or in a direction parallel to the first direction.

The first coil 120 may be configured to correspond to the magnets 130. In other words, if the magnets 130 are constructed to form a single magnet body and the entire inner surface of the magnet 130, which faces the outer surface of the first coil 120, has the same polarity, the outer surface of the first coil 120, which corresponds to the inner surface of the magnet 130, may have the same polarity.

Alternatively, the magnet 130 may be divided into two or four magnets with respect to the surface perpendicular to the optical axis, and thus the inner surface of the magnet 130, which faces the outer surface of the first coil 120, may also be divided into two or four surfaces, in which case the first coil 120 may also be divided into a number of coils that corresponds to the number of magnets 130 resulting from the division.

The magnet 130 may be disposed at a position corresponding to that of the first coil 120. Referring to FIG. 8, the magnet 130 may be disposed to face the first coil 120 as well as the first sensor 170. This is the case in which the magnet 130 is used as the magnet for the first sensor 170 without providing an additional magnet for the first sensor 170, as in one embodiment.

In this case, the magnet 130 may be received to be supported in a first side portion 141 of the housing 140, as shown in FIG. 7. The magnet 130 may be configured to have an approximately cuboid shape corresponding to that of the first side portion 141 of the housing 140, and the surface of the magnet 130 that faces the first coil 120 may be configured to have a curvature corresponding to that of the corresponding surface of the first coil 120.

The magnets 130 may be constituted by a single magnet body. Referring to FIG. 5a, which shows the embodiment, the magnet 130 may be disposed such that the inner surface of the magnet 130, which faces the first coil 120, serves as an S pole 132, whereas the outer surface of the magnet 130 serves as an N pole 134. However, the embodiments are not limited thereto, and the inverted disposition is also possible.

Two or more magnets 130 may be provided. According to the embodiment, four magnets 130 may be provided. As shown in FIG. 5a, the magnet 130 may be configured to have an approximately rectangular shape when viewed in a plan view. Alternatively, the magnet 130 may be configured to have a triangular shape or a rhombus shape.

Although the surface of the magnet 130 that faces the first coil 120 may be linear, the embodiments are not limited thereto. If the corresponding surface of the first coil 120 is rounded, the magnet 130 may be rounded so as to have a curvature corresponding to that of the rounded surface of the first coil 120. By virtue of this configuration, it is possible to maintain a constant distance between the magnet 130 and the first coil 120. In the embodiment, the magnets 130 may be disposed one at the four first side portions 141 of the housing 140, respectively. However, the embodiments are not limited thereto. In some designs, only one of the surface of the magnet 130 and the surface of the first coil 120 may be a flat surface, whereas the other surface may be a curved surface. Furthermore, the mating surfaces of both the first coil 120 and the magnet 130 may be curved surfaces. In this case, the mating surfaces of the first coil 120 and the magnet 130 may have the same curvature.

When the magnets 130 have a rectangular shape when viewed in a plan view, as illustrated in FIG. 5a, a pair of magnets 130 among the plurality of magnets 130 may be oriented parallel to each other in the second direction, and the other pair of magnets 130 may be oriented parallel to each other in the third direction. By virtue of this configuration, it is possible to control the movement of the housing 140 for handshake correction explained later.

The housing 140 may have a polygonal shape when viewed in a plan view. Although the outer contour of the upper end of the housing 140 may have a square plan view, as shown in FIG. 6, which shows the embodiment, the inner contour of the lower end of the housing 140 may have an octagonal plane view, as shown in FIGS. 6 and 7. Accordingly, the housing 140 may include a plurality of side portions, for example, four first side portions 141 and four second side portions 142.

The first side portions 141 may be the portions on which the magnets 130 are mounted, and the second side portions 142 may be the portions on which the support members 220 described later are disposed. The first side portions 141 may connect the second side portions 142 to each other, and may include flat surfaces having a predetermined depth.

Depending on the embodiment, the first side portions 141 may be configured to have a surface area equal to or larger than that of the magnets 130. Referring to FIG. 7, the magnets 130 may be held in magnet mounting portions 141a, which are formed at lower portions of inner surfaces of the first side portions 141. The magnet mounting portions 141a may be embodied as recesses having a size corresponding to that of the magnets 130, and may be disposed so as to face at least three surfaces, that is, opposite lateral side surfaces and the upper surface of the magnets 130. The magnet mounting portions 141a may have openings, which are provided in the bottom surfaces thereof and which face the second coil 230 explained later, such that the bottom surfaces of the magnets 130 directly face the second coil 230.

Although the magnets 130 may be secured to the magnet mounting portions 141a using an adhesive, an adhesive member such as a piece of double-sided adhesive tape may alternatively be used without limitation. Alternatively, the magnet mounting portions 141a may be embodied as magnet mounting holes into which the magnets 130 are partially fitted or through which the magnets 130 are partially exposed, unlike the recessed structure shown in FIG. 7.

The first side portions 141 may be disposed parallel to the side surfaces of the cover member 300. The first side portions 141 may be configured to have a larger area than the second side portions 142. The second side portions 142 may define passages through which the support members extend. Upper portions of the second side portions 142 may include first through holes 147. The support members 220 may extend through the first through holes 147 and may be connected to the upper elastic member 150.

The housing 140 may further include second stoppers 144. The second stoppers 144 may prevent the upper surface of the body of the housing 140 from directly colliding with the inner surface of the cover member 300 shown in FIG. 1.

The housing 140 may further include a plurality of first upper support protrusions 143 formed on the second side portions 142. The plurality of first upper support protrusions 143 may have a hemispherical shape, as shown in the drawings, or may have a circular cylindrical shape or a rectangular column shape. However, the embodiments are not limited as to the shape of the first upper support protrusions 143.

Referring to FIGS. 6 and 7, the housing 140 may be provided with first recesses 142a formed in the second side portions 142. The first recesses 142a are provided so as to provide paths through which the support members 220 extend, as well as spaces to be filled with a gel-type silicone which may play the role of damping. In other words, the first recesses 142a may be filled with damping silicone.

Figure 12:
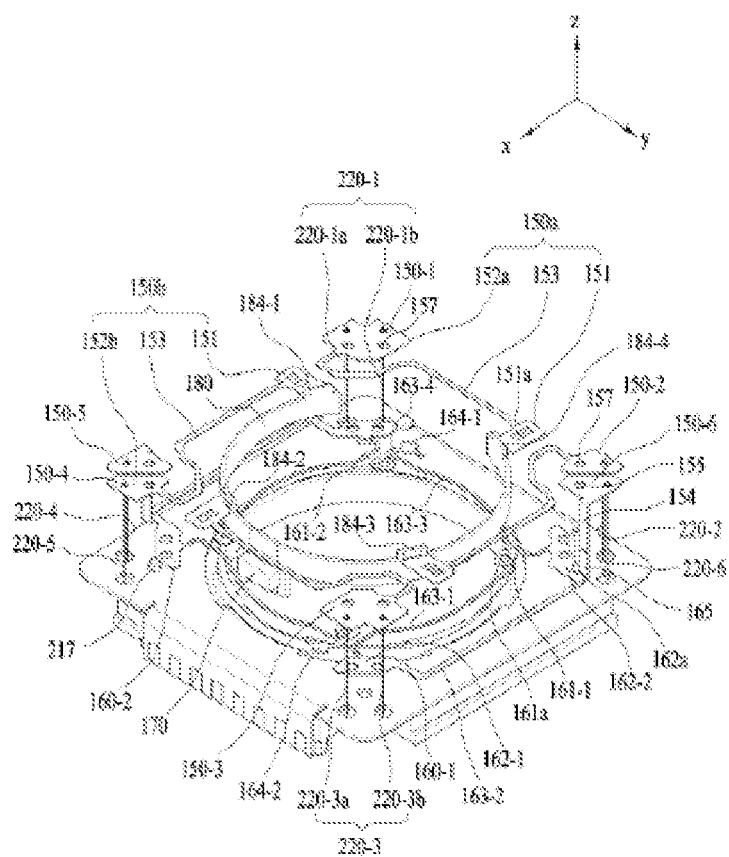
FIG. 12 is a perspective view according to the embodiment of the upper elastic member, the lower elastic member, the first sensor, the sensor substrate, the base, the support member and the circuit board, all of which are coupled to one another.

FIG. 12 is a perspective view according to the embodiment of the upper elastic member 150, the lower elastic member 160, the first sensor 170, the sensor substrate 180, the base 210, the support members 220 and the circuit board 250, all of which are coupled to one another.

According to the embodiment, the upper elastic member 150 may include at least four upper elastic members 150, that is, first to fourth upper elastic members 150-1, 150-2, 150-3, and 150-4, which are conductively isolated from each other. The elastic member contacts 184-1, 184-2, 184-3, and 184-4, which are connected to the first sensor 170, may be connected to the plurality of support members 220 through the first to fourth upper elastic members 150-1, 150-2, 150-3, and 150-4. Specifically, the first upper elastic member 150-1, which is connected to the elastic member contact 184-4, may be connected to a first support member 220-1, that is, first of first and second of first support members 220-1a and 220-1b, and the second upper elastic member 150-2, which is connected to the elastic member contact 184-3, may be connected to a second support member 220-2. Furthermore, the third upper elastic member 150-3, which is connected to the elastic member contact 184-2, may be connected to a third support member 220-3, that is, first of third and second of third support members 220-3a and 220-3b, and the fourth upper elastic member 150-4, which is connected to the elastic member contact 184-1, may be connected to a fourth support member 220-4.

Each element 150a of the first and third upper elastic members 150-1 and 150-3 may include the first inner frame 151, a first of first outer frame 152a, and the first frame connector 153, and each element 150b of the second and fourth upper elastic members 150-2 and 150-4 may include the first inner frame 151, a first of first outer frame 152b, and the first frame connector 153. The first inner frame 151 may be coupled to the bobbin 110 and to the associated elastic member contacts 184-1, 184-2, 184-3, and 184-4. As shown in FIG. 4, when the upper surface 112a of the second protrusion 112 is flat, the first inner frame 151 may be placed on the upper surface 112a and may be secured thereto by means of an adhesive member. According to another embodiment, when a support protrusion (not shown) is formed on the upper surface 112a, unlike the embodiment shown in FIG. 4, the support protrusion may be inserted into a first of second through hole 151a formed in the first inner frame 151, and then may be secured thereto through thermal fusion or by means of an adhesive such as epoxy.

The first of first outer frames 152a and 152b may be coupled to the housing 140 and may be connected to the support members 220. The first frame connector 153 may connect the first inner frame 151 and the first of first outer frame 152a and 152b. Although the first of first outer frame 152b has a configuration in which the first of first outer frame 152a is divided into two segments, the embodiments are not limited thereto. In other words, in another embodiment, the first of first outer frame 152a may also be divided into two segments in the same manner as the first of first outer frame 152b.

The first frame connector 153 may be bent at least one time to define a predetermined pattern. The upward and/or downward movement of the bobbin 110 in the first direction, which is parallel to the optical axis, may be flexibly supported by positional change and fine deformation of the first frame connector 153.

The plurality of first upper support protrusions 143 of the housing 140 may couple and secure the first of first outer frames 152a and 152b of the upper elastic member 150 to the housing 140, as illustrated in FIG. 12. In this embodiment, the first of first outer frames 152a and 152b may be provided with second of second through holes 157 at positions corresponding to the first upper support protrusions 143 of the first of first outer frames 152a and 152b, the second of second through holes 152 having shape corresponding to the first upper support protrusions 143. The upper support protrusions 143 and the second of second through holes 157 may be coupled to each other through thermal fusion or by means of an adhesive such as epoxy.

In order to secure the plurality of first to fourth upper elastic members 150-1, 150-2, 150-3, and 150-4, a sufficient number of first upper support protrusions 143 may be provided. Accordingly, it is possible to prevent the first to fourth upper elastic members 150-1, 150-2, 150-3, and 150-4 and the housing 140 from being unreliably coupled to each other.

The distance between the plurality of first upper support protrusions 143 may be appropriately set such that the first upper support protrusions 143 do not interfere with peripheral components. Specifically, the first upper support protrusions 143 may be disposed at the corners of the housing 140 at regular intervals so as to be symmetrical with respect to the center of the bobbin 110, or may be disposed at irregular intervals so as to be symmetrical with respect to a specific imaginary line extending through the center of the bobbin 110.

After the first inner frame 151 is coupled to the bobbin 110 and the first of first outer frames 152a and 152b are coupled to the housing 140, conductive connecting members CP11, CP12, CP13, and CP14, made for example of solder, may be provided between the elastic member contacts 184-1, 84-2, 184-3, and 184-4 of the sensor substrate 180 and the first inner frame 151, as shown in FIG. 10, so as to enable power having different polarities to be applied to two pins P11 and P12, among the four pins P11, P12, P13 and P14 of the first sensor 170, and to enable different feedback signals to be output from two other pins P21 and P22. In order to enable the application of power having different polarities and the output of the feedback signals having different polarities in this way, the upper elastic member 150 may be divided into the first to fourth upper elastic members 150-1, 150-2, 150-3, and 150-4.

The first to fourth upper elastic members 150-1, 150-2, 150-3, and 150-4 are connected to the circuit board 250 via the support members 220. Specifically, the first upper elastic member 150-1 may be connected to the circuit board 250 via at least one of the first of first support member 220-1a or the second of first support member 220-1b, and the second upper elastic member 150-2 may be connected to the circuit board 250 via the second support member 220-2. Furthermore, the third upper elastic member 150-3 may be connected to the circuit board 250 via at least one of the first of third support member 220-3a or the second of third support member 220-3b, and the fourth upper elastic member 150-4 may be connected to the circuit board 250 via the fourth support member 220-4. Accordingly, the first sensor 170 may receive power supplied from the circuit board 250 through the support members 220 and the upper elastic member 150, or may output feedback signals and provide the feedback signals to the circuit board 250.

The lower elastic member 160 may include a first lower elastic member 160-1 and a second lower elastic member 160-2, which are conductively isolated from each other. The first coil 120 may be connected to the plurality of support members 220 through the first and second lower elastic members 160-1 and 160-2.

Each of the first and second lower elastic members 160-1 and 160-2 may include at least one of the second inner frame 161-1 or 161-2, at least one of the second outer frame 162-1 or 162-2, and at least one of the second frame connectors 163-1, 163-2, 163-3, or 163-4.

The second inner frames 161-1 and 161-2 may be coupled to the bobbin 110, and the second outer frames 162-1 and 162-2 may be coupled to the housing 140. The first of second frame connector 163-1 may connect the second inner frame 161-1 and the second outer frame 162-1, the second of second frame connector 163-2 may connect two second outer frames 162-1 and 162-2, and the third of second frame connector 163-3 may connect the second inner frame 161-2 and the second outer frame 162-2.

The first lower elastic member 160-1 may further include a first coil frame 164-1, and the second lower elastic member 160-2 may further include a second coil frame 164-2. Referring to FIG. 11, the first and second coil frames 164-1 and 164-2 may be electrically connected to both ending lines of the first coil 120 through conductive connecting members, such as solder, at positions on the upper surface thereof which are disposed near the pair of winding protrusions 119a and 119b, around which the two ending lines of the first coil 120 are wound, whereby the first and second lower elastic members 160-1 and 160-2 may receive power having different polarities and may transmit the power to the first coil 120. In order to enable the application of power having different polarities and transmission of the power to the first coil 120 in this way, the lower elastic member 160 may be divided into the first and second lower elastic members 160-1 and 160-2.

Each of the first and second lower elastic members 160-1 and 160-2 may further include a fourth of second frame connector 163-4. The fourth of second frame connector 163-4 may connect the first and second coil frames 164-1 and 164-2 and the second inner frame 161-2.

At least one of the first of second through fourth of second frame connectors 163-1, 163-2, 163-3, or 163-4 may be bent at least one time to define a predetermined pattern. Particularly, the upward and/or downward movement of the bobbin 110 in the first direction, parallel to the optical axis, may be flexibly supported by positional change and fine deformation of the first of second frame connector 163-1 and the third of second frame connector 163-3.

According to one embodiment, each of the first and second lower elastic members 160-1 and 160-2 may further include a bent portion 165. The bent portion 165 is bent toward the upper elastic member 150 in the first direction from the second of second frame connector 163-2. The upper elastic member 150 may further include fifth and sixth upper elastic members 150-5 and 150-6, which are conductively isolated from each other. Each of the fifth and sixth upper elastic members 150-5 and 150-6 may further include a connecting frame 154 and a second of first outer frame 155. The connecting frame 154 may be connected to the bent portion 165, and may extend in the first direction. The second of first outer frame 155 may be bent at the connecting frame 154 in a direction perpendicular to the first direction, may be coupled to the housing 140, and may be connected to the support member 220. In other words, the fifth upper elastic member 150-5 may be connected to a fifth support member 220-5, and the sixth upper elastic member 150-6 may be connected to a sixth support member 220-6. Here, the respective bent portions 165 of the first and second lower elastic members 160-1 and 160-2 and the connecting frame 154 and the second of first outer frame 155 of the fifth and sixth upper elastic members 150-5 and 150-6 may be integrally formed. In this way, each of the first and second lower elastic members 160-1 and 160-2 and each of the fifth and sixth upper elastic members 150-5 and 150-6 may have the portions 165 and 154, which are bent in the first direction.

According to another embodiment, the connecting frame 154 of each of the fifth and sixth upper elastic members 150-5 and 150-6 may be bent at the second of first outer frame 155 and may extend from the second of first outer frame 155 to the second of second frame connector 163-2 in the first direction, unlike the embodiment illustrated in FIG. 12. In this case, the bent portions 165 of the first and second lower elastic members 160-1 and 160-2, which are illustrated in FIG. 12, may be omitted. In this way, each of the first and second lower elastic members 160-1 and 160-2 may not include the bent portion, which is bent in the first direction, and each of the fifth and sixth upper elastic members 150-5 and 150-6 may include the bent portion 154, which is bent in the first direction.

According to a still further embodiment, the bent portion 165 of each of the first and second lower elastic members 160-1 and 160-2 may be bent in the first direction at the second of second frame connector 163-2 and may extend from the second of second frame connector 163-2 to the second of first outer frame 155, unlike the embodiment illustrated in FIG. 12. In this case, the bent portion 154 of each of the fifth and sixth upper elastic members 150-5 and 150-6 shown in FIG. 12 may be omitted. Thus, even though each of the first and second lower elastic members 160-1 and 160-2 does include the bent portion 165, which is bent in the first direction, each of the fifth and sixth upper elastic members 150-5 and 150-6 may not include the bent portion, which is bent in the first direction.

According to still another embodiment, the housing 140 may further be provided with an insert or a metal attachment (not shown), unlike the embodiment shown in FIG. 12. In this case, the second of first outer frame 155 and the second of second frame connector 163-2 may be connected to each other via the metal attachment. In this case, the bent portion 155 and the connecting frame 154, which are shown in FIG. 12, may be omitted. In this way, each of the first and second lower elastic members 160-1 and 160-2 and each of the fifth and sixth upper elastic members 150-5 and 150-6 may not include the bent portion, which is bent in the first direction.

As described above, at least one of the upper elastic members or the lower elastic members may include the bent portion, which is bent in the first direction, and any of the upper elastic members and the lower elastic members may not include the bent portion, which is bent in the first direction.

The second of first outer frame 155 may further include the second of second through hole 157, like the first of first outer frame 152b.

According to one embodiment, the first of first outer frames 152a and 152b of the first to sixth upper elastic members 150-1, 150-2, 150-3, 150-4, 150-5, and 150-6 may be disposed to face each other in a diagonal direction, and the second of first outer frames 155 may be disposed to face each other in a diagonal direction. Specifically, the first of first outer frame 152a of the first upper elastic member 150-1 and the first of first outer frame 152a of the third upper elastic member 150-3 may be disposed to face each other in a diagonal direction. Furthermore, the first of first outer frame 152b of the second upper elastic member 150-2 and the first of first outer frame 152b of the fourth upper elastic member 150-4 may be disposed to face each other in a diagonal direction. In addition, the second of first outer frame 155 of the fifth upper elastic member 150-5 and the second of first outer frame 155 of the sixth upper elastic member 150-6 may be disposed to face each other in a diagonal direction.

Alternatively, according to another embodiment, although not shown in the drawings, the first of first outer frames 152a and 152b of the first to sixth upper elastic members 150-1, 150-2, 150-3, 150-4, 150-5, and 150-6 may be disposed at arbitrary two of the four corners illustrated in FIG. 12, rather than being disposed to face each other in a diagonal direction, and the second of first outer frames 155 may be disposed at the remaining two of the four corners, rather than being disposed to face each other in a diagonal direction.

It will be appreciated that the first and second lower elastic members 160-1 and 160-2 receive power from the circuit board 250 through the fifth and sixth upper elastic members 150-5 and 150-6, which are connected to the plurality of support members 220, and that they provide the power to the first coil 120. Specifically, the first lower elastic member 160-1 may be connected to the circuit board 250 through the sixth upper elastic member 150-6 and the sixth support member 220-6, and the second lower elastic member 160-2 may be connected to the circuit board 250 through the fifth upper elastic member 150-5 and the fifth support member 220-5.

Referring to FIG. 11, the lower surface of the bobbin 110 may be provided with a plurality of first lower support protrusions 117 so as to couple and secure the second inner frames 161-1 and 161-2 of the lower elastic member 160 and the bobbin 110 to each other. The lower surface of the housing 140 may be provided with a plurality of second lower support protrusions 145 so as to couple and secure the second outer frames 162-1 and 162-2 of the lower elastic member 160 and the housing 140 to each other.

The number of second lower support protrusions 145 may be greater than the number of first lower support protrusions 117. This is because the second frame connector 163-2 of the lower elastic member 160 is longer than the first frame connector 163-1.

As described above, since the lower elastic member 160 is divided into two lower elastic members, the first and second lower support protrusions 117 and 145 are provided in a sufficient number, as the number of first upper support protrusions 143, whereby it is possible to prevent a gap that would otherwise be created when the lower elastic member 160 is separated.

In the case where the lower elastic member 160 is constituted not by divided segments but by a single body, there is no necessity to provide a large number of first and second lower support protrusions 117 and 145 as much as the number of first upper support protrusions 143. This is because the lower elastic member 160 can be reliably coupled to the housing 140 by only a small number of first and second lower support protrusions 117 and 145.

However, when the lower elastic member 160 is divided into the first and second lower elastic members 160-1 and 160-2, which are conductively isolated from each other, as in the embodiment, a number of first and second lower support protrusions 117 and 145 sufficient to hold the divided first and second lower elastic members 160-1 and 160-2 may be provided. Accordingly, it is possible to prevent the first and second lower elastic members 160-1 and 160-2 and the housing 140 from being incompletely coupled to each other.

Still referring to FIG. 11, the first and second lower support protrusions 117 and 145 may have a hemispherical shape, like the first upper support protrusions 143, or may have a circular cylindrical shape or a rectangular column shape. However, the embodiments are not limited as to the shape of the first and second lower support protrusions 117 and 145.

Referring to FIG. 12, according to the embodiment, the second inner frames 161-1 and 161-2 of the first and second lower elastic members 160-1 and 160-2 may be provided with third through holes 161a, which are formed at positions corresponding to the first lower support protrusions 117 and have a shape corresponding to that of the first lower support protrusions 117. The first lower support protrusions 117 and the third through holes 161a may be coupled to each other through thermal fusion or by means of an adhesive such as epoxy.

Furthermore, the second outer frames 162-1 and 162-2 of each of the first and second lower elastic members 160-1 and 160-2 may be provided with fourth through holes 162a, which are formed at positions corresponding to the second lower support protrusions 145. The second lower support protrusions 145 and the fourth through holes 162a may be coupled to each other through thermal fusion or by means of an adhesive such as epoxy.

The distance between adjacent ones of the plurality of first lower support protrusions 117 and 145 may be appropriately set such that the first lower support protrusions do not interfere with peripheral components. Specifically, the first and second lower support protrusions 117 and 145 may be disposed at regular intervals so as to be symmetrical with respect to the center point of the bobbin 110.

Although each of the upper elastic member 150 and the lower elastic member 160 may be embodied as leaf springs, the embodiments are not limited as to the material of the upper and lower elastic members 150 and 160.

The bobbin 110, the housing 140 and the upper and lower elastic members 150 and 160 may be assembled to each other through thermal fusion and/or a bonding procedure using an adhesive. Here, the assembly may be performed in such a manner as to perform thermal fusion and then a bonding procedure using an adhesive, depending on the assembly sequence.

For example, when the bobbin 110 and the second inner frames 161-1 and 161-2 of the lower elastic member 160 are firstly assembled to each other in the first assembly and then the housing 140 and the second outer frames 162-1 and 162-2 of the lower elastic member 160 are secondly assembled to each other in the second assembly, the first lower support protrusions 117 of the bobbin 110 may be coupled to the third through holes 161a, and the second lower support protrusions 145 of the housing 140 may be coupled to the fourth through holes 162a through thermal fusion. When the first inner frame 151 of the upper elastic member 150 is first assembled in the third assembly, the elastic member contacts 184-1, 184-2, 184-3, and 184-4 of the sensor substrate 180 and the first inner frames 151 of each of the first to fourth upper elastic members 150-1, 150-2, 150-3, and 150-4 may be coupled to each other through thermal fusion. Thereafter, when the housing 140 and the first of first and second of first outer frames 152a, 152b and 155 of the upper elastic member 150 are coupled to each other in the fourth assembly, the second of second through holes 157 may be bonded to the first upper support protrusions 143 of the housing 140 through the application of an adhesive such as epoxy. However, the assembly sequence may be changed. In other words, the first to third assemblies may be performed through thermal fusion, and the fourth assembly may be performed through bonding. Although thermal fusion may entail deformation, i.e., warping, the bonding in the fourth assembly may compensate for such deformation.

In the above embodiment, power may be supplied to the first sensor 170 through two of the four upper elastic members 150, which are conductively isolated from each other, a feedback signal output from the first sensor 170 may be transmitted to the circuit board 250 through the remaining other two upper elastic members 150, which are conductively isolated from each other, and power may be supplied to the first coil 120 through the two lower elastic members 160, which are conductively isolated from each other. However, the embodiments are not limited thereto.

According to another embodiment, the role of the plurality of upper elastic members 150 and that of the plurality of lower elastic members 160 may be swapped. Specifically, power may be supplied to the first coil 120 through two of the four upper elastic members 150, which are conductively isolated from each other, power may be supplied to the first sensor 170 through two of the four lower elastic members 160, which are conductively isolated from each other, and a feedback signal output from the first sensor 170 may be transmitted to the circuit board 250 through the remaining other two lower elastic members 160, which are conductively isolated from each other. Although not illustrated, this will be readily understood from the preceding drawings.

Hereinafter, the upper and lower elastic members 150 and 160 will be briefly described when the role of the upper elastic members 150 and the role of the lower elastic member 160 are exchanged with each other. In this case, the lower elastic members may be divided in the same fashion as the upper elastic members 150 illustrated in FIG. 10, and the upper elastic members may be divided in the same fashion as the lower elastic members 160 illustrated in FIG. 11. The sensor substrate 180 may be coupled to the bobbin 110, and the elastic member contacts of the sensor substrate 180 may protrude so as to face the lower elastic members 160 rather than to face the upper elastic members 150, and may be coupled to the corresponding lower elastic members 160.

The lower elastic members may include at least four lower elastic members, that is, first to fourth lower elastic members, which are separated from each other, and the first sensor 170 may be connected to the plurality of support members 220 via the first to fourth lower elastic members.

Each of the first to fourth lower elastic members may include the first inner frame coupled to the bobbin 110, the first of first outer frame coupled to the housing 140 and connected to the support member 220, and the first frame connector, connecting the first inner frame to the first of first outer frame.

The upper elastic member may include at least two upper elastic members, that is, the first and second upper elastic members, which are separated from each other, and the first coil 120 may be connected to the plurality of support members 220 via the first and second upper elastic members.

Each of the first and second upper elastic members may include at least one second inner frame coupled to the bobbin 110, at least one second outer frame coupled to the housing 140, and the first of second frame connector, which connects at least one second inner frame to at least one second outer frame.

At least one second outer frame may include a plurality of second outer frames, and each of the first and second upper elastic members may further include the second of second frame connector, which connects the plurality of second outer frames to each other.

The at least four lower elastic members may further include the fifth and sixth lower elastic members, which are separated from each other, and each of the fifth and sixth lower elastic members may include the second of first outer frame, which is formed in a direction perpendicular to the first direction and which is coupled to the housing 140 and connected to the support member 220.

Each of the first and second upper elastic members may further include a bent portion, which is bent at the second of second frame connector toward the lower elastic member in the first direction. Each of the fifth and sixth lower elastic members may further include a connecting frame connecting the bent portion to the second of first outer frame.

Alternatively, each of the fifth and sixth lower elastic members may further include a connecting frame, which is bent at the second of first outer frame and extends to the second of second frame connector in the first direction. Here, the bent portion, the connecting frame, and the second of first outer frame may be integrally formed with each other.

Alternatively, each of the first and second upper elastic members may further include a bent portion, which is bent at the second of second frame connector and extends to the second of first outer frame in the first direction.

Alternatively, the lens driving apparatus may further include an insert or a metal attachment in the housing 140, and the second of first outer frame and the third of second frame connector may be connected to each other via the metal attachment.

Each of the first and second upper elastic members may further include a coil frame connected to the corresponding one of two ends of the first coil 120, and a third of second frame connector connecting the coil frame to at least one second inner frame.

Referring to FIGS. 3, 6, 7, 10 and 11, the side surface of the housing 140 may be provided with a plurality of third stoppers 149. The third stoppers 149 intended to prevent the body of the housing 140 from colliding with the cover member 300 when the first lens driving unit moves in the second and/or third directions may prevent the side surface of the housing 140 from directly colliding with the inner surface of the cover member 300 upon the application of external impact. As shown in the drawings, although the third stoppers 149 are disposed two on each outer surface of the housing 140 with a constant interval therebetween, the embodiments are not limited as to the positions or number of the third stoppers 149.

Although not shown in the drawings, the housing 140 may further be provided at the lower surface thereof with fourth stoppers. The fourth stoppers may project from the lower surface of the housing 140. The fourth stoppers may serve to prevent the lower surface of the housing 140 from colliding with the base 210 and/or the circuit board 250, which will be described later. In addition, the fourth stoppers may be maintained in the state of being spaced apart from the base 210 and/or the circuit board 250 by a predetermined distance in the initial position and are operating normally. By virtue of this construction, the housing 140 may be spaced apart downward from the base 210 and may be spaced apart upward from the cover member 300, whereby the housing 140 may be maintained at a constant level in the optical axis direction without interfering with other components. Accordingly, the housing 140 may shift in the second and/or third directions, which are an anteroposterior direction and a right or left direction, in a plane perpendicular to the optical axis.

The first lens driving unit according to the embodiment may precisely control the movement of the bobbin 110 by detecting the position of the bobbin 110 through the first sensor 170 in the optical axis direction, that is, the first direction in the z-axis, or a direction parallel to the first direction. This may be achieved through feedback by providing information about the position, detected by the first sensor 170, to the outside through the circuit board 250.

According to one embodiment, in order to move the bobbin 110 in the optical axis direction, that is, the first direction or a direction parallel to the first direction, a magnet (hereinafter referred to as the detecting magnet; not shown), which faces the first sensor 170, may further be provided, in addition to the magnet 130 (hereinafter referred to as the autofocusing magnet) that faces the first coil 120. In this embodiment, the interaction between the autofocusing magnet 130 and the first coil 120 may be obstructed by the detecting magnet. This is because a magnetic field may be generated by the detecting magnet. Accordingly, in order to prevent the detecting magnet, which is separately provided, from interacting with the autofocusing magnet 130 or in order to prevent the bobbin 110 from being tilted but to allow the interaction between the detecting magnet and the autofocusing magnet 130, the first sensor 170 may be disposed to face the detecting magnet. In this case, the first sensor 170 may be disposed, coupled or mounted on the bobbin 110, and the detecting magnet may be disposed, coupled or mounted on the housing 140. Alternatively, the first sensor 170 may be disposed, coupled or mounted on the housing 140, and the detecting magnet may be disposed, coupled or mounted on the bobbin 110.

According to another embodiment, in place of additional disposition of the detecting magnet, the autofocusing magnet may be used as the detecting magnet in order to move the bobbin 110 in the optical axis direction, that is, the first direction or a direction parallel to the first direction. For example, in order for the autofocusing magnet 130 to also serve as the detecting magnet, the first sensor 170 may not be disposed on the housing 140 but may be disposed, coupled or mounted on the bobbin 110 so as to be moved with the bobbin 110. Accordingly, when both the autofocusing magnet and the detecting magnet are present together, problems caused by the interaction between the two magnets may be fundamentally solved. For example, it is not necessary to provide a piece of magnetic field compensating metal (not shown) for minimizing the interaction between the autofocusing magnet and the detecting magnet.

In some cases, the first lens driving unit may further include various devices for improving the autofocusing function of the first lens driving unit, in addition to the first sensor 170. In this case, the positions of the devices or the method or process of receiving power through the circuit board 250 and supplying feedback signals to the circuit board 250 may be identical to those of the first sensor 170.

Referring again to FIG. 2, the second lens driving unit, which serves as a handshake correction lens driving unit as aforementioned, may include the first lens driving unit, the base 210, the plurality of support members 220, the second coil 230, the second sensor 240, and the circuit board 250.

Although the first lens driving unit may include the above-mentioned components, the above-mentioned components may be replaced with another optical system capable of fulfilling the autofocusing function. Specifically, the first lens driving unit may be constituted by an optical module using a single lens moving actuator or a variable refractive index actuator, in place of using an autofocusing actuator employing a voice coil motor. In other words, the first lens driving unit may adopt any optical actuator as long as it is capable of fulfilling an autofocusing function. However, there is a need to install the magnet 130 at a position corresponding to the second coil 230, which will be described later.

Figure 13:
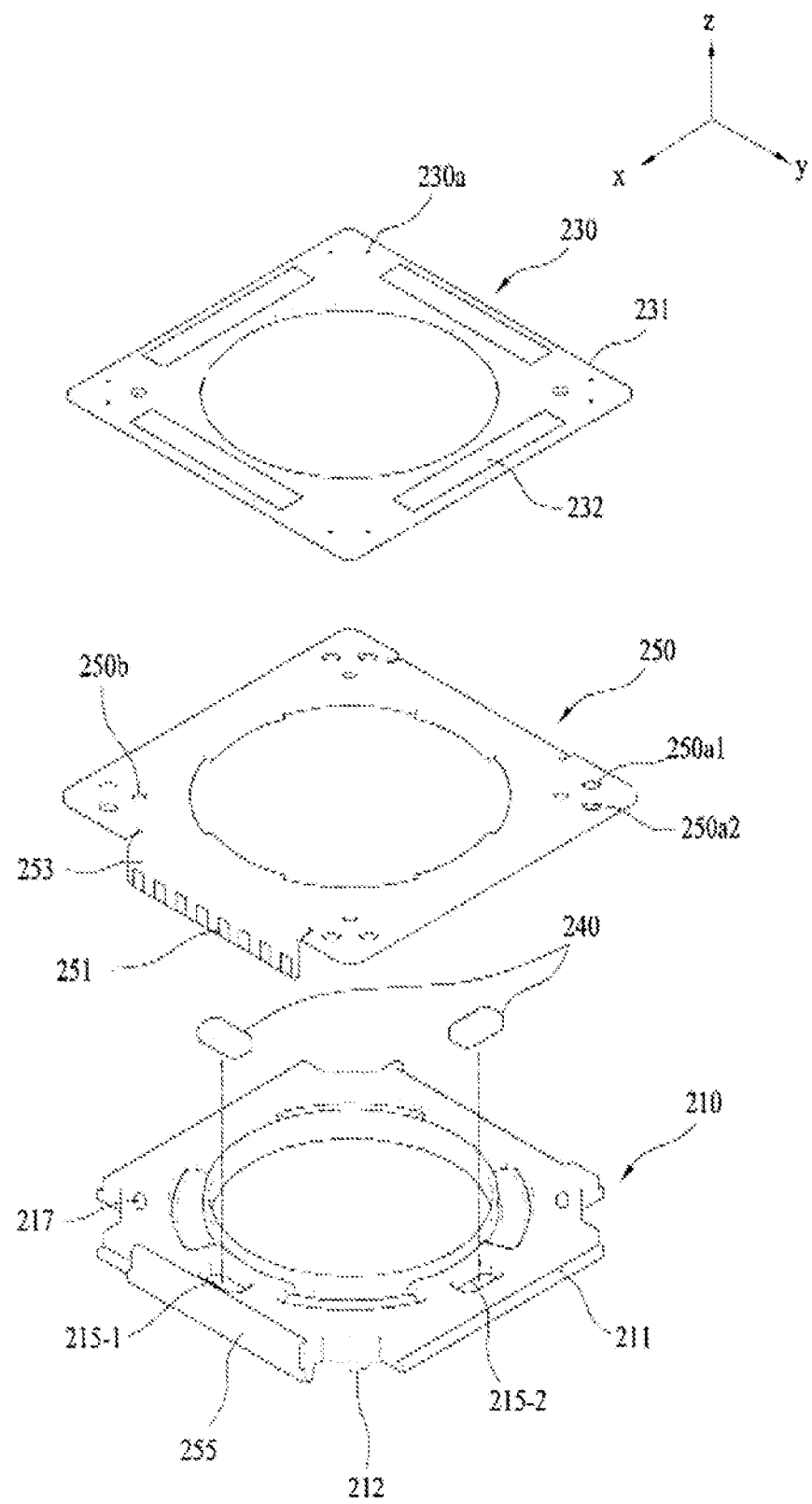
FIG. 13 is an exploded perspective view of the base, the second coil and the circuit board.

FIG. 13 is an exploded perspective view of the base 210, the second coil 230 and the circuit board 250.

As shown in FIGS. 2 and 13, the base 210 of the second lens driving unit may have an approximately rectangular shape when viewed in a plan view. The base 210 may be provided with stepped portions 211, to which an adhesive is applied when adhesively securing the cover member 300 to the base 210, as illustrated in FIG. 13. The stepped portion 211 may guide the cover member 300, which is coupled to the upper side of the base 210, and may enable the end of the cover member 300 to contact the base 210 in a surface-contact manner. The stepped portions 211 and the end of the cover member 300 may be adhesively secured to each other and may be sealed shut using an adhesive or the like.

The base 210 may be disposed so as to be spaced apart from the first lens driving unit by a predetermined distance. The base 210 may be provided with a supporting portion 255, which is positioned at the portion of the base 210 facing the portion of the circuit board 250 at which terminals 251 are formed and which has a size corresponding to that portion of the circuit board 250. The supporting portion 255 may be configured to have a constant cross-sectional area from the outer surface of the base 210 without the stepped portion 211 so as to support a terminal pad 253 having the terminals 251.

The base 210 may have second recesses 212 formed in the corners thereof. When the cover member 300 includes projections formed at the corners thereof, the projections on the cover member 300 may be fitted into the second recesses 212 to be combined with the base 210.

The base 210 may be provided in the upper surface thereof with second mounting recesses 215-1 and 215-2, in which the second sensors 240 are disposed. According to the embodiment, two second mounting recesses 215-1 and 215-2 are provided, and the second sensors 240 are respectively disposed in the second mounting recesses 215-1 and 215-2, whereby the second sensors 240 are able to detect the extent by which the housing 140 moves in the second and/or third directions. To this end, the two second mounting recesses 215-1 and 215-2 may be disposed such that the angle defined by two imaginary lines connecting the two second mounting recesses 215-1 and 215-2 and the center of the base 210 is 90°.

Each of the second mounting recesses 215-1 and 215-2 may be provided on at least one surface thereof with an inclined surface tapered (not shown) so as to allow epoxy or the like for the assembly of the second sensors 240 to be more easily injected through the inclined surface. The additional epoxy or the like may not be injected into the second mounting recesses 215-1 and 215-2, or may be injected in order to secure the second sensors 240 in place. The second mounting recesses 215-1 and 215-2 may be disposed at or near the center of the second coil 230. The center of second coil 230 and the center of the second sensor 240 may coincide with each other. According to the embodiment, the second mounting recesses 215-1 and 215-2 may be formed at the sides of the base 210.

The cover member 300 may be provided with a slot at a position corresponding to the stepped portion 211 of the base 210 so as to allow the injection of an adhesive or the like through the slot. At this point, since the adhesive, which is injected through the slot, has a low viscosity, the adhesive can easily infiltrate between the stepped portion 211 and the end surface of the cover member 300. The adhesive, which is applied to the slot, may fill the gap between the mating surfaces of the cover member 300 and the base 210 through the slot, and thus the cover member 300 may be sealingly coupled to the base 210.

The base 210 may further be provided on the lower surface thereof with a mounting seat (not shown), on which a filter is installed. The filter may be an infrared screening filter. However, the embodiments are not limited thereto, and the base 210 may be provided on the lower surface thereof with an additional sensor holder on which a filter is disposed. As described later, the base 210 may be provided on the lower surface thereof with a sensor substrate, on which an image sensor is mounted so as to constitute a camera module.

The plurality of support members 220 may be disposed at the second side portions 142 of the housing 140. As described above, when the housing 140 has, for example, a polygonal shape when viewed in a plan view, the housing 140 may have a plurality of second side portions 142. If the interior of the lower end of the housing 140 has an octagonal bottom view shape, the plurality of support members 220 may be disposed at four second side portions 142, among the eight side portions. For example, each of the four second side portions 142 may be provided with two support members 220, and a total of eight support members 220 may thus be provided.

Alternatively, among the four second side portions 142 of the housing 140, each of two second side portions 142 may be provided with only one support member 220, and each of the remaining other two second side portions 142 may be provided with two support members 220, with the result that a total of six support members 220 may be provided.

As described above, the support members 220 may serve as the paths for transmitting the power required for the first sensor 170 and the first coil 120 and the paths for providing the circuit board 250 with the feedback signals output from the first sensor 170.

Furthermore, since the support members 220 serve to return the housing 140 to its initial position after the housing 140 has moved in the second and/or third directions in the first lens driving unit, when the same number of support members 220 are disposed in the diagonal direction, the elastic coefficient may be balanced. Specifically, when the housing 140 moves in the second and/or third directions in the plane perpendicular to the optical axis direction, the support members 220 may be finely and elastically deformed in the direction in which the housing 140 moves or in the length direction of the support members 220. Here, the term "length direction" may refer to the direction connecting the upper end and the lower end of each wire of the support members 220. Accordingly, the housing 140 can move only in the second and/or third directions, which are substantially perpendicular to the optical axis, with almost no displacement in the first direction, which is parallel to the optical axis, thus improving the accuracy of handshake correction. This may be obtained by the characteristic that the support members 220 are capable of being stretched in the length direction.

As shown in FIG. 12, each of the four first to fourth support members 220-1, 220-2, 220-3 and 220-4 includes a pair of support members and is individually disposed at each of four second side portions 142 among the eight side portions of the housing 140 so as to support the housing 140 in the state of being spaced apart from the base 210 by a predetermined distance.

The first to fourth support members 220-1, 220-2, 220-3 and 220-4 according to the embodiment may be respectively disposed at the second side portions 142 of the housing 140 so as to be symmetrical with one another. However, the embodiments are not limited thereto. In other words, the shape and number of the plurality of support members 220 may be set to be symmetrical to one another in the second and third directions, which are perpendicular to the first direction. In consideration of the above-mentioned elastic coefficient, the number of support members 220 may be eight as aforementioned.

Although the support members 220 have been described as being embodied as suspension wires without a predetermined pattern in the above embodiment, the embodiments are not limited thereto. According to another embodiment, the support members 200 may be embodied as plates type having elastic deformation portions (not shown).

Referring to FIG. 13, the second coil 230 may include fifth through holes 230a formed by passing-through the corner regions of a circuit member 231. The support members 220 may extend through the fifth through holes 230a and may be connected to the circuit board 250. Alternatively, when the second coil 230 is an FP coil, an optical image stabilizer (OIS) coil 232 may be formed or disposed on a partial region of the FP coil. Furthermore, the support members 220 may be conductively soldered to the areas of the second coil 230 in which the fifth through holes 230a would otherwise be formed, without the formation of the fifth through holes 230a.

The second coil 230 may be disposed to face the magnet 130 secured to the housing 140. For example, the second coil 230 may be disposed outside the magnet 130. Alternatively, the second coil 230 may be disposed under the magnet 130 so as to be spaced apart from the magnet 130 by a predetermined distance.

In the embodiment, although the second coil 230 may include a total of four second coils, which are disposed at the four sides of the circuit board 250, as shown in FIG. 13, the embodiments are not limited thereto. Only two coils 230, namely, a second coil for the second direction and a second coil for the third direction, may be provided, or four or more second coils 230 may alternatively be provided. According to the embodiment, a circuit pattern may be formed on the circuit board 250 so as to have the shape of the second coil 230, and an additional second coil 230 may be disposed on the circuit board 250. However, the embodiments are not limited thereto, and only the separate second coil 230 may be disposed on the circuit board 250 without forming the circuit pattern having the shape of the second coil 230 on the circuit board 250. Alternatively, the second coil 230, which is constituted by winding a wire into a doughnut shape or which is constituted by a FP (fine pattern) coil, may be conductively connected to the circuit board 250.

The circuit member 231 including the second coil 230 may be mounted on the circuit board 250 disposed over the base 210. However, the embodiments are not limited thereto, and the second coil 230 may be closely disposed on the base, or may be spaced apart from the base 210 by a predetermined distance. Furthermore, the second coil 230 may be formed on an additional substrate, and the substrate may be layered on the circuit board 250 and may be connected thereto.

As described above, the housing 140 may be moved in the second and/or third directions by the interaction of the magnets 130 and the second coil 230, which are disposed to face each other, thus implementing handshake correction. To this end, the first to fourth support members 220 may support the housing 140 relative to the base 210 such that the housing 140 can move in the second and/or third directions, which are perpendicular to the first direction.

The second sensors 240 may detect displacement of the first lens driving unit relative to the base 210 in the second and/or third directions, which are perpendicular to the optical axis. To this end, the second sensors 240 may be disposed at the center of the second coil 230, with the circuit board 250 disposed therebetween so as to detect movement of the housing 140. In other words, the second sensors 240 may not be directly connected to the second coil 230, and the circuit board 250 may be provided on the upper surface thereof with the second coil 230 and on the lower surface thereof with the second sensors 240. According to the embodiment, the second sensors 240, the second coil 230, and the magnet 130 may be disposed on the same axis.

The second sensors 240 may be embodied as Hall sensors, but may alternatively be embodied as any kind of sensor as long as it is capable of detecting variation in magnetic force. As shown in FIG. 13, two second sensors 240 may be disposed at the sides of the base 210 disposed under the circuit board 250, and may be fitted in the second mounting recesses 215-1 and 215-2 formed in the base 210.

The circuit board 250 may include sixth through holes 250a1 and 250a2, through which the support members 220 may extend. The support members 220 may extend through the sixth through holes 250a1 and 250a2 in the circuit board 250 and may be conductively connected to the associated circuit patterns, which may be disposed on the lower surface of the circuit board 250, via soldering.

The circuit board 250 may further include seventh through holes 250b. The second upper support protrusions 217 of the base 210 and the seventh through holes 250b may be coupled as shown in FIG. 12, and may be secured to each other through thermal fusion or by means of an adhesive such as epoxy.

The circuit board 250 may further include a plurality of terminals 251. The circuit board 250 may be provided with the bent terminal pad 253. Depending on the embodiment, the one bent terminal pad 253 of the circuit board 250 may be provided with at least one terminal 251.

Depending on the embodiment, the plurality of terminals 251 provided on the terminal pad 253 may receive external power, and may supply the power to the first and second coils 120 and 130 and the first and second sensors 170 and 240. Furthermore, the plurality of terminals 251 may output the feedback signals, output from the first sensor 170, to the outside. The number of terminals 251 provided on the terminal pad 252 may be increased or decreased depending on the kinds of components to be controlled.

According to the embodiment, although the circuit board 250 may be embodied as an FPCB, the embodiments are not limited thereto. The terminals of the circuit board 250 may be directly formed on the surface of the base 210 through a process of forming a surface electrode.

As described above, the circuit board 250 may supply power (or current) required for the first coil 120 and the first sensor 170, and may receive the feedback signals from the first sensor 170 so as to adjust the displacement of the bobbin 110.

The lens driving apparatus according to this embodiment may be incorporated in devices in various fields, for example, a camera module. For example, such a camera module may be applied to mobile devices such as cellular phones (or mobile phones), and may further be applied to various multimedia fields including notebook personal computers, camera phones, PDAs, smart phones and toys, and image input devices such as information terminals of monitoring cameras and video tape recorders.

The camera module according to this embodiment may include the lens barrel coupled to the bobbin 110, an image sensor (not shown), a circuit board 250, and an optical system.

The lens barrel may be constructed as described above, and the circuit board 250 may constitute the bottom surface of the camera module, starting from the area on which the image sensor is mounted.

The optical system may include at least one lens for transmitting images to the image sensor. The optical system may be provided with an actuator module capable of fulfilling autofocusing and handshake correction functions. The actuator module for fulfilling the autofocusing function may be constructed in various fashions, but mainly adopts a voice coil unit motor. The lens driving apparatus according to this embodiment may serve as an actuator module for fulfilling both autofocusing and handshake correction functions.

The camera module may further include an infrared ray (IR) screening filter (not shown). The infrared ray screening filter serves to shield the image sensor from light in the infrared range. In this case, the base 210, which is illustrated in FIG. 2, may be provided with the infrared ray screening filter at a position corresponding to the image sensor, and the infrared ray screening filter may be coupled to a holder member (not shown). Furthermore, the base 210 may support the lower portion of the holder member.

The base 210 may be provided with an additional terminal member for connection with the circuit board 250, and the terminal member may be integrally formed using a surface electrode. The base 210 may serve as a sensor holder for protecting the image sensor. In this case, although the base 210 may be provided along the lateral side surface thereof with protrusions projecting downward, these are not essential components. Although not shown in the drawings, an additional sensor holder disposed under the base 210 may fulfill the function of the protrusions.

In the lens driving apparatus according to the embodiment, which is constructed as described above, since the first and second lens driving units share the magnet 130, it is possible to implement autofocusing and handshake correction functions using only the magnet 130.

In the lens driving apparatus 100 and the camera module including the lens driving apparatus 100 according to the embodiment, the first sensor 170 may be disposed, coupled or mounted on the housing 140 or the bobbin 110, and the autofocusing magnet 130 may also be used as the detecting magnet or a detecting magnet may be additionally disposed. If the autofocusing magnet 130 is also used as the detecting magnet or the detecting magnet is disposed so as not to interact with the autofocusing magnet 130, the detecting magnet does not affect the autofocusing magnet 130. Consequently, tilting of the bobbin 110 does not occur, and the accuracy of a feedback signal is improved. Furthermore, the number of parts is not increased, and the weight of the housing 140 is reduced, thereby improving responsiveness. Alternatively, the autofocusing magnet and the handshake correction magnet may also be separately provided.

Another Embodiment

Figure 14:
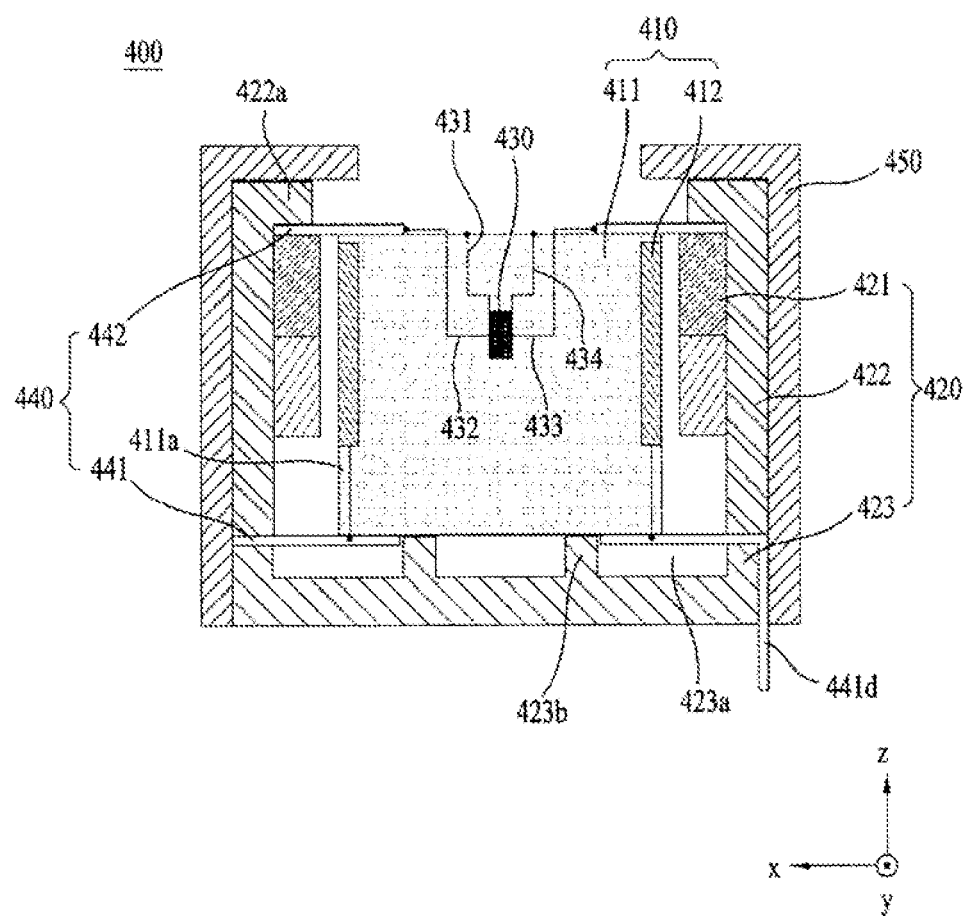
FIG. 14 is a schematic side cross-sectional view of a lens driving apparatus according to another embodiment.
Figure 15:
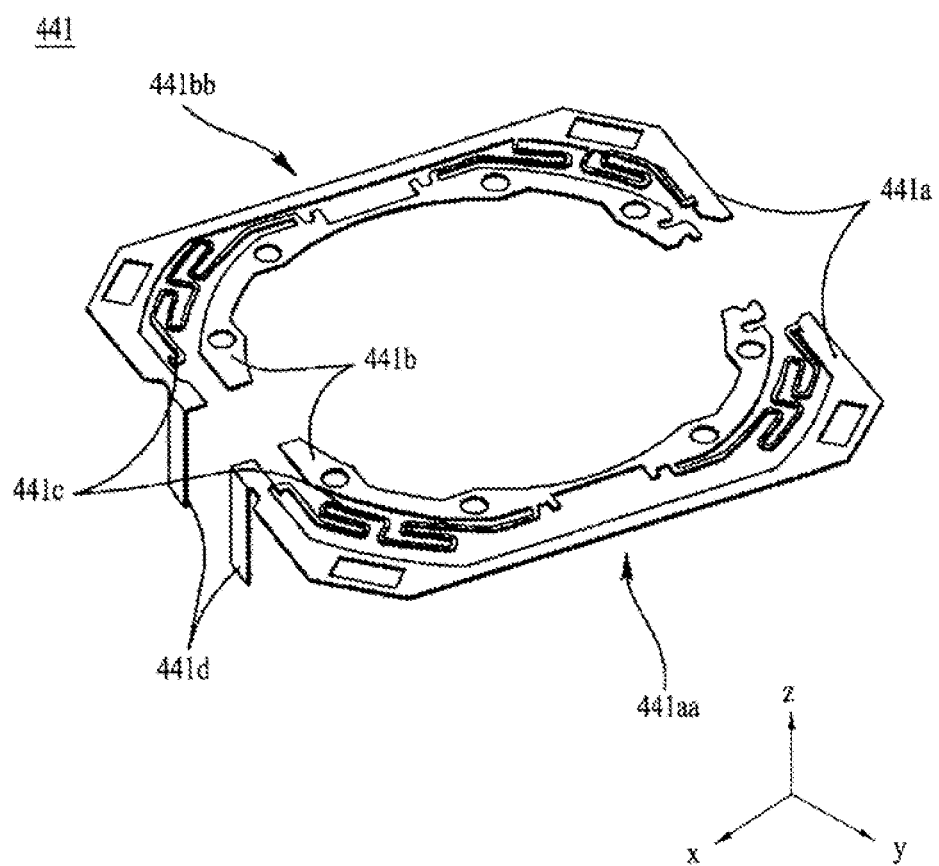
FIG. 15 is a perspective view of a first elastic unit according to the embodiment.
Figure 16:
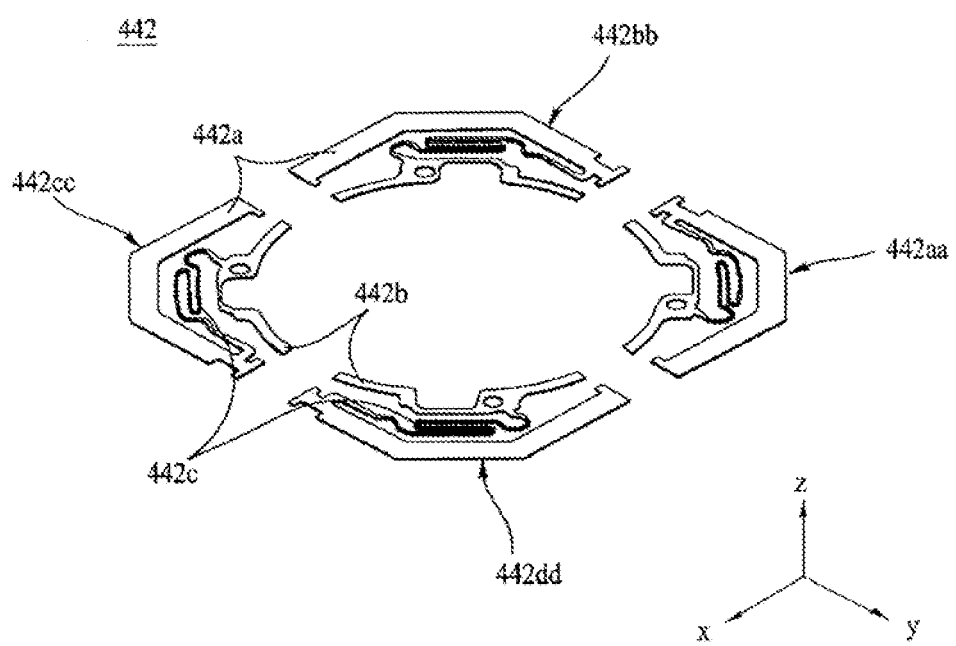
FIG. 16 is a perspective view of a second elastic unit according to the embodiment.

FIG. 14 is a schematic side cross-sectional view of a lens driving apparatus 400 according to another embodiment. FIG. 15 is a perspective view of a first elastic part 441 illustrated in FIG. 14 according to the embodiment. FIG. 16 is a perspective view of a second elastic part 442 illustrated in FIG. 14 according to the embodiment.

Referring to FIGS. 14 to 16, the lens driving apparatus 400 according to the embodiment may include a mover 410, a stator 420, a first sensor 430, and an elastic unit 440. The lens driving apparatus 400 according to the embodiment may further include a cover can 450 and a substrate (not shown).

The cover can 450 may accommodate the mover 410, the stator 420, the first sensor 430, and the elastic member (or the elastic unit) 440, which will be described later, and may be mounted on a base 423 so as to define the appearance of the lens driving apparatus 400.

The cover can 450 may be mounted on the base 423 such that the inner surface of the cover can 450 is in close contact with the lateral side portion of the base 423, which will be described later, protect the internal components from external impacts, and prevent the infiltration of external contaminants.

Furthermore, the cover can 450 must also fulfill a function of protecting the components of the camera module, which will be described later, from external radio wave interference generated by cellular phones or the like. Accordingly, the cover can 450 may be made of metal.

The cover can 450 may be constituted by a housing 422 itself, which will be described later, or the housing 422 may be molded on the inner surface of the cover can 450. In this embodiment, the cover can 450 may be provided in the upper wall thereof with an opening through which a lens unit (not shown) is exposed.

The mover 410 may include the lens unit (not shown) and a bobbin 411, and may further include a coil 412.

The lens unit (not shown) may be a lens barrel, but the embodiment is not limited to that. The lens unit may be constituted by any structure as long as it is a holder structure capable of supporting the lens. In this embodiment, the case in which the lens unit is a lens barrel will be described. The lens unit may be mounted on the base 423, which will be described later, and may be disposed at a position corresponding to an image sensor. The lens unit may include one or more lenses (not shown).

The bobbin 411 may be coupled to the lens unit so as to hold the lens unit. The manner in which the lens unit is coupled to the bobbin 411 may be identical to that in which the lens barrel is coupled to the bobbin 110, which is illustrated in FIG. 2.

The bobbin 411 may be provided in the outer circumferential surface thereof with a guide 411a for guiding the coil 412, which is wound or mounted thereon. The guide 411a may be integrally formed with the outer side surface of the bobbin 411, and may be consecutively formed along the outer surface of the bobbin 411, or may be formed on the outer surface of the bobbin 411 at regular intervals.

At least one of the upper or lower surface of the bobbin 411 may be provided with a coupling protrusion to which at least one of a first elastic part 441 or a second elastic part 442 is coupled so as to support the bobbin 411 on the base 423, which will be described later.

The coil 412 may be wound around the outer surface of the bobbin 411 while being guided by the guide 411a, or may be previously wound in advance and then mounted on the guide 411a. Alternatively, four separate coils may be disposed on the outer surface of the bobbin 411 at an interval of 90°. Power is applied to the first elastic part 441 from the substrate, which will be described later, and the coil 412 may receive the power from the first elastic part 441 so as to create an electromagnetic field. In other words, when power is applied to the coil 412, a magnet unit 421 and the coil 412 may electromagnetically interact with each other.

The stator 420 may support the mover 410, and may include the magnet unit 421, the housing 422, and the base 423.

The magnet unit 421 may be mounted on the housing 422 using an adhesive or the like such that the magnet unit 421 is disposed at a position corresponding to the outer surface of the coil 412. The magnet unit 421 may include a plurality of magnet units, which are internally mounted at four corners of the housing 422 at regular intervals for efficient utilization of the internal space of the housing 422.

Alternatively, the magnet units 421 may be mounted on four inner side surfaces of the housing 422 so as to face the coil 412.

The magnet included in the magnet unit 421 may be configured to have a polygonal column form, such as a triangular column, a rectangular column or a trapezoidal column, and the polygonal column may partially include a curved surface. Some of the corner edges of the magnet may be manufactured so as to be curved.

The housing 422 may be configured so as to correspond to the inner surface of the cover can 450, which defines the appearance of the lens driving apparatus 400. The housing 422 and the cover can 450 may not be separately provided but may be integrally formed with each other so as to define the appearance of the lens driving apparatus 400.

In the embodiment, the housing 422 or the cover can 450 may be open at one of the upper or lower side thereof, and may be coupled at one end thereof to the elastic member 440 so as to support the mover 410. The housing 422 may include a magnet unit mounting hole or a magnet unit mounting recess, which is formed in the inner side surface or the corner of the housing so as to have a shape corresponding to the magnet unit 421. For example, the magnet unit mounting hole or the magnet unit mounting recess may have a shape similar to that of the magnet mounting portion 141a illustrated in FIG. 7.

The housing 422 may be made of an insulating material, like the above-described housing 140, and may be injection-molded in consideration of productivity.

The housing 422 may be provided on the upper surface thereof with a stopper 422a, which protrudes a predetermined length. Consequently, when an external impact is applied to the housing 422, the stopper 422a is able to absorb the impact by contacting the upper surface of the cover can 450. The stopper 422a may be integrally formed with the housing 422, and may also be provided on the bobbin 411.

The base 423 may be provided in the center thereof with a circular recess 423a, which is depressed downward so as to support at least one of the mover 410 or the housing 422 and to cause the bobbin 411 to be spaced apart from the base 423. The recess 423a may be provided at the center thereof with a restriction protrusion 423b for restricting the downward movement of the bobbin 411.

The base 423 may serve as a sensor holder for protecting an image sensor (not shown), which will be described later. Here, the base 423 may be provided on the side surface thereof with a protrusion, which extends downward, so as to position an infrared ray (IR) screening filter (not shown) thereat.

In this case, the IR screening filter may be mounted in a through hole formed in the center of the base 423, and may include a blue filter. The IR screening filter may be made of, for example, a film or glass material, and an infrared ray screening coating material may be applied to a flat plate-shaped optical filter such as a glass cover for protecting an imaging area and the glass cover. In addition to the base 423, an additional sensor holder may be disposed under the base 423.

The base 423 may be provided with one or more holding protrusions, which protrude from the upper corner of the base 423 so as to be in surface contact with or coupled to the inner surface of the cover can 450. The holding protrusions serve to guide the cover can 450 so as to allow the cover can 450 to be easily coupled and serve to securely maintain the cover can 450 after coupling.

Specifically, the stator 420 according to the embodiment holds the mover 410 positioned therein, and moves the lens unit so as to adjust the focus of an image.

The first sensor 430 may serve not only to detect variation in a magnetic field of the magnet unit 421 so as to detect movement of the mover 410 and but also to precisely control an actuator. For example, the first sensor 430 may play the same role as the first sensor 170 illustrated in FIG. 2.

In the embodiment, the first sensor 430 may be provided on the outer surface of the bobbin 411 so as to detect variation in a magnetic field of the magnet unit 421 disposed on the housing 422, and may include one or more first sensors. Accordingly, according to this embodiment, it is possible to reduce the weight of the mover 410 and the power required to drive the lens unit and to reduce the volume of the lens driving apparatus 400 by disposing the magnet unit 421 on the stator 420.

The first sensor 430 may be disposed in a recess formed in a portion of the outer surface of the bobbin 411. The coil 412 may be disposed on the outer surface of the bobbin 411, and the first sensor 430 may be disposed in the coil 412. The first sensor 430 may be shielded by the coil 412 so as not to be visible from the outside. Alternatively, the first sensor 430 may also be disposed outside the coil 412.

Although the first sensor 430 is illustrated in the drawing as having four terminals 431 to 434, the terminals of the first sensor 430 may be varied depending on the kind of the first sensor 430. For example, the four terminals 431 to 434 may be a positive (+) electrode, a negative (−) electrode, a ground, and an output terminal. Accordingly, the second elastic part 442, which will be described later, may be constituted by at least two leaf springs so as to match the number of terminals of the first sensor 430.

Although the first sensor 430 may be disposed closer to the coil 412 than the magnet unit 421, the influence of the coil 412 on the detection of movement of the mover 410 may be disregarded, considering that the intensity of the magnetic field created in the magnet of the magnet unit 421 is several hundred times the intensity of the electromagnetic field created in the coil.

The elastic member 440 may include the first elastic part 441 and the second elastic part 442.

The first elastic part 441 may be connected at respective ends thereof to first sides of the bobbin 411 and the stator 420 so as to allow power to be applied to the coil 412 of the stator 420. The second elastic part 442 may be connected at respective ends thereof to second sides of the bobbin 411 and the stator 420 so as to be conductively connected to the first sensor 430.

Here, although the first elastic part 441 and the second elastic part 442 may be constituted by separate springs disposed on the respective sides of the housing 422, it may be constituted by a leaf spring, which is prepared by bending and cutting a plate, for efficiency of production.

The first sides of the bobbin 411 and the stator 420, to which the first elastic part 441 is connected, may be the upper sides or the lower sides of the bobbin 411 and the stator 420. In the same way, the second sides of the bobbin 411 and the stator 420, to which the second elastic part 442 is connected, may be the lower sides or the upper sides of the bobbin 411 and the stator 420.

For example, the first elastic part 441 may be disposed at the upper side of the bobbin 411, and the second elastic part 442 may be disposed at the lower side of the bobbin 411. In this case, for example, the first elastic part 441 may be disposed similarly to the upper elastic member 150, and the second elastic part 442 may be disposed similarly to the lower elastic member 160.

Alternatively, the first elastic part 441 may be disposed at the lower side of the bobbin 411, and the second elastic part 442 may be disposed at the upper side of the bobbin 411. In this case, for example, the first elastic part 441 may be disposed similarly to the lower elastic member 160, and the second elastic part 442 may be disposed similarly to the upper elastic member 150.

Since the first elastic part 441 is illustrated as being disposed at the lower side of the bobbin 411 and the second elastic part 442 is illustrated as being disposed at the upper side of the bobbin 411, the following description will be made based on this arrangement.

Referring to FIGS. 15 and 16, each of the first elastic part 441 and the second elastic part 442 may be configured to have an approximately ring shape. The inner circumference of each of the first elastic part 441 and the second elastic part 442 may have an approximately circular shape so as to correspond to the mover 410, and the outer circumference thereof may have an approximately rectangular shape so as to correspond to the shape of the housing 422 or the base 423.

In detail, each of the first elastic part 441 and the second elastic part 442 may include outer portions 441a and 442a coupled to the stator 420, inner portions 441b and 442b having a coupling hole corresponding to the coupling protrusion of the bobbin 411 so as to be coupled to the bobbin 411, and connecting portions 441c and 442c connecting the outer portions 441a and 442a to the inner portions 441b and 442b and providing elastic force. As illustrated in the drawings, each of the connecting portions 441c and 442c may be constituted by one or more bent portions connecting the inner portion 441b and 442b and the outer portions 441a and 442a and the one or more bent portions may be integrally formed with one another.

The outer portion 441a of the first elastic part 441 may be disposed between the lower end of the housing 422 and the base 423 or on the base 423, and the inner portion 441b of the first elastic part 441 may be coupled to the lower surface of the bobbin 411 so as to support the bobbin 411 and to provide the bobbin 411 with restoring force.

The first elastic part 441 may include a first spring 441aa and a second spring 441bb, which are spaced apart from each other. Power, which is applied from the substrate, which will be described later, may be input to or output from the first spring 441aa and the second 441bb.

The first spring 441aa and the second spring 441bb may be constituted by leaf springs, which are configured to be symmetrical with each other. Although the first spring 441aa and the second spring 441bb may together be constituted by a single leaf spring, they are preferably constituted by separate respective leaf springs for the input and output of power. The first spring 441aa and the second spring 441bb may be symmetrical with each other in the second direction (for example, the x-axis direction) or in the third direction (for example, the y-axis direction), which is perpendicular to the first direction (for example, the z-axis direction) in which the mover 410 is moved.

The first spring 441aa and the second spring 441bb may be provided with respective terminals 441d, which are bent at the outer portions 441a and 442a and are soldered to the substrate. For example, the coil 412, which is wound around the bobbin 411, may be conductively connected at both ends thereof to the inner portions 441b of the first spring 441aa and the second spring 441bb, and the terminals 441d, which are respectively formed at the first spring 441aa and the second spring 441bb, may be secured to the side surface of the base 423 and may be conductively connected to the substrate, which will be described later. By virtue of this wiring structure, power may be supplied to the coil 412.

Meanwhile, the second elastic part 442 may be constituted by at least two leaf springs so as to match the number of terminals of the first sensor 430. Since the first sensor 430 is provided with four terminals 431, 432, 433 and 434 in this embodiment, the second elastic part 442 may be divided into four segments, which are spaced apart from one another so as to be symmetrical with one another.

Specifically, separate leaf springs 442aa, 442bb, 442cc and 442dd of the second elastic part 442 may be constructed such that the respective inner portions 442b thereof are conductively connected to the first sensor 430 and the respective outer portions 442a thereof are conductively connected to the substrate, which will be described later, via electric wires (not shown) or metal members (not shown) disposed outside the housing 422 or surface metal layers formed on the housing 422.

In this embodiment, the conductive connection of the respective elements may be implemented through soldering.

The lens driving apparatus 400 according to this embodiment may be used in various fields, for example, in a camera module, like the lens driving apparatus 100 illustrated in FIGS. 1 and 2.

As in the camera module including the lens driving apparatus 100, a camera module in which the lens driving apparatus 400 according to the embodiment is incorporated may further include a printed circuit board, an image sensor and the like as well as the lens driving apparatus although not shown in the drawings.

The printed circuit board (not shown) may be provided on the center of the upper surface thereof with the image sensor (not shown) and various elements (not shown) for driving the camera module. In order to apply power required to drive the lens driving apparatus 400 according to the embodiment, the printed circuit board may be conductively connected to the coil 412 via the terminal 441c or 441d of the first elastic part 441.

The image sensor (not shown) may be mounted on the center of the upper surface of the printed circuit board so as to be positioned along the optical axis direction with one or more lenses (not shown) accommodated in the lens unit. The image sensor may convert an optical signal of an object, which is introduced through the lenses, into an electrical signal.

The description of the lens driving apparatus 100 according to one embodiment may also be applied to the lens driving apparatus 400 according to another embodiment as long as the description is not contradictory to the description of the lens driving apparatus 400 according to another embodiment. Furthermore, the description of the lens driving apparatus 400 according to another embodiment may also be applied to the lens driving apparatus 100 according to the one embodiment as long as the description is not contradictory to the description of the lens driving apparatus 100 according to the one embodiment.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

[Mode for Invention]

The mode for the invention has been sufficiently described in the best mode for carrying out the invention.

INDUSTRIAL APPLICABILITY

The lens driving apparatus and camera module according to the embodiments may be applied to mobile devices such as cellular phones (or mobile phones), and may further be applied to various multimedia fields including notebook personal computers, camera phones, PDAs, smart phones and toys, and image input devices such as information terminals of monitoring cameras and video tape recorders.

The invention claimed is:

1. A lens driving apparatus, comprising:
a base;
a housing disposed on the base;
a bobbin disposed in the housing;
a first coil disposed on an outer circumferential surface of the bobbin;
first magnets disposed on the housing and opposite the first coil;
a circuit board comprising a second coil disposed so as to face the first magnets;
an upper elastic member coupled to both an upper surface of the bobbin and the housing;
a first sensor detecting displacement of the bobbin in a first direction parallel to an optical axis direction; and
a plurality of support members electrically connecting the upper elastic member to the circuit board,
wherein the bobbin comprises a protrusion more protruding from the outer circumferential surface of the bobbin than the coil,
wherein the protrusion of the bobbin comprises a first protrusion, and a second protrusion adjacent to the first protrusion,
wherein the first protrusion and the second protrusion protrude in a second direction and a third direction, which are perpendicular to each other and perpendicular to the first direction,
wherein the first protrusion and the second protrusion are disposed alternately, forming a first space and a second space therebetween,
wherein the first space is formed between the first protrusion and the second protrusion which are protruding in a direction perpendicular to each other,
wherein the second space is formed between the first protrusion and the second protrusion which are protruding in a direction parallel to each other,
wherein the housing comprises a first portion including a third protrusion protruding toward the bobbin at a position corresponding to the first space,
wherein the first sensor is disposed on the bobbin and overlapped with the second space, and
wherein a surface of the third protrusion has the same shape as a side surface of the bobbin at a position corresponding to the first space.

2. The lens driving apparatus according to claim 1, comprising:
a lower elastic member coupled to both a lower surface of the bobbin and the housing; and
a second magnet disposed opposite to the first sensor,
wherein the plurality of support members supports the housing such that the housing is movable with respect to the base in second and third directions perpendicular to the first direction.

3. The lens driving apparatus according to claim 2, wherein at least one of the plurality of support members electrically connects the lower elastic member to the circuit board,
wherein the upper elastic member comprises a plurality of upper elastic members, which are spaced apart from one another, and
wherein at least a part of the upper elastic member is disposed on the protrusion of the bobbin.

4. The lens driving apparatus according to claim 2, wherein the first and second magnets are formed separately from each other.

5. The lens driving apparatus according to claim 1, wherein the upper elastic member comprises an inner frame coupled to the bobbin, and
wherein the second protrusion of the bobbin comprises a first upper surface on which the inner frame of the upper elastic member is disposed.

6. The lens driving apparatus according to claim 1, wherein the upper elastic member comprises an inner frame coupled to the bobbin, and
wherein the second protrusion of the bobbin comprises an upper support protrusion protruding in the first direction, the inner frame of the upper elastic member being coupled to the upper support protrusion.

7. The lens driving apparatus according to claim 2, wherein the lower elastic member comprises:
an inner frame coupled to the bobbin;
an outer frame coupled to the housing; and
a frame connector connecting the inner frame to the outer frame,
wherein the bobbin comprises a first lower support protrusion,
wherein the inner frame of the lower elastic member is coupled to the first lower support protrusions,
wherein the housing comprises a second lower support protrusion, and wherein the outer frame of the lower elastic member is coupled to the second lower support protrusions.

8. The lens driving apparatus according to claim 7, wherein the first lower support protrusion comprises a hemispherical shape, a circular cylindrical shape, or a rectangular column shape, and
wherein the second lower support protrusion comprises a hemispherical shape, a circular cylindrical shape, or a rectangular column shape.

9. The lens driving apparatus according to claim 1, wherein the housing comprises first side portions and second side portions,
wherein the first magnets are disposed on the first side portions, and
wherein the plurality of support members are disposed on the second side portions, respectively.

10. The lens driving apparatus according to claim 9, wherein the number of the first side portions is four and the number of the second side portions is four, and
wherein the second side portions are corner portions of the housing.

11. The lens driving apparatus according to claim 9, wherein the housing comprises magnet mounting portions, the magnet mounting portions comprising second recesses,
wherein each of the second recesses has a size corresponding to that of each of the first magnets, and
wherein the first magnets are disposed in the magnet mounting portions such that bottom surfaces of the first magnets face the second coil.

12. The lens driving apparatus according to claim 10, comprising a cover member coupled to the base,
wherein the first side portions are disposed parallel to side surfaces of the cover member.

13. The lens driving apparatus according to claim 10, wherein each of the first side portions has a larger area than each of the second side portions.

14. The lens driving apparatus according to claim 13, wherein upper portions of the second side portions comprise first through holes, and
wherein the supporting members extend through the first through holes and are connected to the upper elastic member.

15. The lens driving apparatus according to claim 1, wherein the first to third protrusions are disposed on positions corresponding to corners of the housing, respectively.

16. The lens driving apparatus according to claim 15, wherein the third protrusion is disposed opposite to the first protrusion, and
wherein the second protrusion is disposed between the first space and the second space.

17. The lens driving apparatus according to claim 1, wherein the first protrusion is configured to guide an installation of the upper elastic member at a predetermined position, and
wherein the third protrusion comprises the convex shape.

18. A camera apparatus comprising the lens driving apparatus of claim 1.

19. A phone comprising the camera apparatus of claim 18.

20. The lens driving apparatus according to claim 1, wherein the plurality of support members is soldered with a lower surface of the circuit board.

* * * * *